(12) United States Patent
Jung et al.

(10) Patent No.: US 10,802,635 B2
(45) Date of Patent: Oct. 13, 2020

(54) PANEL BOTTOM MEMBER AND DISPLAY DEVICE INCLUDING THE SAME

(71) Applicant: SAMSUNG DISPLAY CO., LTD., Yongin-si, Gyeonggi-Do (KR)

(72) Inventors: Kyung Ho Jung, Seongnam-si (KR); Hyun Seok Ko, Suwon-si (KR); Jae Ho Lee, Seongnam-si (KR); Joo Nyung Jang, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/376,700

(22) Filed: Apr. 5, 2019

(65) Prior Publication Data

US 2020/0004364 A1    Jan. 2, 2020

(30) Foreign Application Priority Data

Jun. 27, 2018  (KR) .................. 10-2018-0074068

(51) Int. Cl.
*G06F 1/16*    (2006.01)
*G06F 3/041*   (2006.01)
*G06F 3/01*    (2006.01)

(52) U.S. Cl.
CPC .......... *G06F 3/0412* (2013.01); *G06F 1/1643* (2013.01); *G06F 3/016* (2013.01)

(58) Field of Classification Search
CPC ......... G02F 1/13439; G02F 2300/0426; G02F 2330/04; G06F 1/1605; G06F 1/1643; G06F 1/1688; G06F 1/20; G06F 1/203; G06F 3/016; G06F 3/0412; H01L 23/562; H01L 27/1288; H01L 27/323; H01L 33/56; H04M 1/0266; H04M 1/03; H04M 1/035; H04R 1/028; H04R 9/06; H04R 17/00; H04R 17/005; H04R 2440/00; H04R 2499/11; H04R 2499/15; H05K 7/20963;
(Continued)

(56) References Cited

U.S. PATENT DOCUMENTS 3,670,434 A *  6/1972  Shibata ................. B42F 5/00
                                                        40/772
8,148,719 B2 * 4/2012  Kim .................... H01L 51/5246
                                                        257/40
(Continued)

FOREIGN PATENT DOCUMENTS

EP        3 471 430        4/2019
KR    10-2017-0115003     10/2017
KR      1020170112790     10/2017

OTHER PUBLICATIONS

Extended European Search Report dated Dec. 17, 2019 for European Application Serial No. 19182101.6.

*Primary Examiner* — Michael J Eurice
(74) *Attorney, Agent, or Firm* — F. Chau & Associates, LLC

(57) ABSTRACT

A panel bottom assembly includes a light-blocker with first concave patterns formed on a top surface thereof. A vibration acoustic device is disposed below, and coupled to, the light-blocker. A buffer is disposed below the light-blocker. A bonding is disposed between the light-blocker and the vibration acoustic device. The bonding has second concave patterns formed on a top surface thereof. The second concave patterns are different from the first concave patterns.

31 Claims, 20 Drawing Sheets

(58) Field of Classification Search
CPC ...... H05K 1/0201; H05K 1/18; H05K 5/0217;
H05K 5/03; H05K 7/20954; H05K
9/0054; H05K 1/0266; H05K 1/03; H05K
1/035
See application file for complete search history.

(56) References Cited

U.S. PATENT DOCUMENTS

| | | | | |
|---|---|---|---|---|
| 8,174,179 | B2* | 5/2012 | Suh | H01L 27/322 |
| | | | | 313/110 |
| 8,851,952 | B2* | 10/2014 | Lee | H05B 33/04 |
| | | | | 445/24 |
| 8,916,852 | B2* | 12/2014 | Kim | H01L 51/5237 |
| | | | | 257/40 |
| 10,381,381 | B1* | 8/2019 | Choi | H01L 27/124 |
| 10,453,827 | B1* | 10/2019 | Hussell | H01L 33/52 |
| 2003/0232561 | A1* | 12/2003 | Yawata | B32B 37/10 |
| | | | | 445/24 |
| 2006/0083894 | A1* | 4/2006 | Vetrovec | B29C 63/0047 |
| | | | | 428/137 |
| 2008/0128683 | A1* | 6/2008 | Kim | H01L 51/5246 |
| | | | | 257/40 |
| 2008/0142791 | A1* | 6/2008 | Kim | H01L 51/5237 |
| | | | | 257/40 |
| 2009/0140996 | A1* | 6/2009 | Takashima | G06F 1/1626 |
| | | | | 345/173 |
| 2010/0007270 | A1* | 1/2010 | Suh | H01L 27/322 |
| | | | | 313/504 |
| 2010/0214662 | A1* | 8/2010 | Takayanagi | B60R 1/088 |
| | | | | 359/630 |
| 2010/0225600 | A1* | 9/2010 | Dai | G06F 3/016 |
| | | | | 345/173 |
| 2010/0225800 | A1 | 9/2010 | Dai et al. | |
| 2010/0244021 | A1* | 9/2010 | Uochi | G02F 1/13454 |
| | | | | 257/43 |
| 2011/0255250 | A1* | 10/2011 | Dinh | G03B 15/03 |
| | | | | 361/749 |
| 2011/0277361 | A1* | 11/2011 | Nichol | G02B 6/0018 |
| | | | | 40/541 |
| 2012/0249907 | A1* | 10/2012 | Kimura | G02F 1/13624 |
| | | | | 349/38 |
| 2013/0081756 | A1* | 4/2013 | Franklin | B29C 53/04 |
| | | | | 156/221 |
| 2013/0134396 | A1* | 5/2013 | Shimomura | C03B 23/203 |
| | | | | 257/40 |
| 2013/0295816 | A1* | 11/2013 | Lee | H01L 51/524 |
| | | | | 445/25 |
| 2014/0117335 | A1* | 5/2014 | Moon | H01L 51/5246 |
| | | | | 257/40 |
| 2014/0118230 | A1* | 5/2014 | Lim | H01L 51/524 |
| | | | | 345/82 |
| 2014/0353620 | A1* | 12/2014 | Park | H01L 27/3258 |
| | | | | 257/40 |
| 2015/0042601 | A1* | 2/2015 | Lee | G06F 3/044 |
| | | | | 345/174 |
| 2015/0341714 | A1* | 11/2015 | Ahn | H04M 1/03 |
| | | | | 381/333 |
| 2016/0062516 | A1* | 3/2016 | Jeong | G06F 3/044 |
| | | | | 345/174 |
| 2016/0293811 | A1* | 10/2016 | Hussell | H01L 25/0753 |
| 2016/0363795 | A1* | 12/2016 | Jeon | G02F 1/1339 |
| 2016/0378224 | A1* | 12/2016 | Kwon | H01L 51/5256 |
| | | | | 345/174 |
| 2017/0062514 | A1* | 3/2017 | Park | H01L 25/0753 |
| 2017/0289324 | A1 | 10/2017 | Yeo et al. | |
| 2019/0090806 | A1* | 3/2019 | Clavelle | G04G 9/0088 |

* cited by examiner

PANEL BOTTOM MEMBER AND DISPLAY DEVICE INCLUDING THE SAME

This application claims the benefit of and priority to Korean Patent Application No. 10-2018-0074068, filed on Jun. 27, 2018, under 35 U.S.C. § 119, the disclosure of which is herein incorporated by reference in its entirety.

TECHNICAL FIELD

The present disclosure relates to a display device and, more specifically, to a panel bottom member and a display device including the same.

DISCUSSION OF THE RELATED ART

Electronic devices, such as a smartphone, a digital camera, a notebook computer, a navigation device, and a smart television (TV), may include display devices for displaying images to users. A display device generally includes a display panel for generating and displaying an image and a panel bottom member disposed below the display panel. The panel bottom member may include various functional sheets for protecting the display panel against heat and external shock.

However, current display devices are generally equipped with only the function of displaying images. Thus, in order to provide sound, electronic devices need to be provided with separate speakers.

SUMMARY

A panel bottom assembly includes a light-blocker with first concave patterns formed on a top surface thereof. A vibration acoustic device is disposed below, and coupled to, the light-blocker. A buffer is disposed below the light-blocker. A bonding is disposed between the light-blocker and the vibration acoustic device. The bonding has second concave patterns formed on a top surface thereof. The second concave patterns are different from the first concave patterns.

A panel bottom assembly includes a light-blocker having a top surface with first concave patterns formed thereon and a bottom surface with second concave patterns formed thereon. A vibration acoustic device is disposed below, and coupled to, the light-blocker. A buffer is disposed below the light-blocker. A second air passage is formed by the second concave patterns between the light-blocker and the vibration acoustic device. The second air passage is different from a first air passage formed by the first concave patterns.

A display device includes a display panel and a panel bottom assembly disposed below the display panel. The panel bottom assembly includes a light-blocker having a top surface with first concave patterns formed thereon. A vibration acoustic device is disposed below, and coupled to, the light-blocker. A buffer is disposed below the light-blocker. A bonding is disposed between the light-blocker and the vibration acoustic device. The bonding has a top surface with second concave patterns formed thereon. The second concave patterns differ from the first concave patterns.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
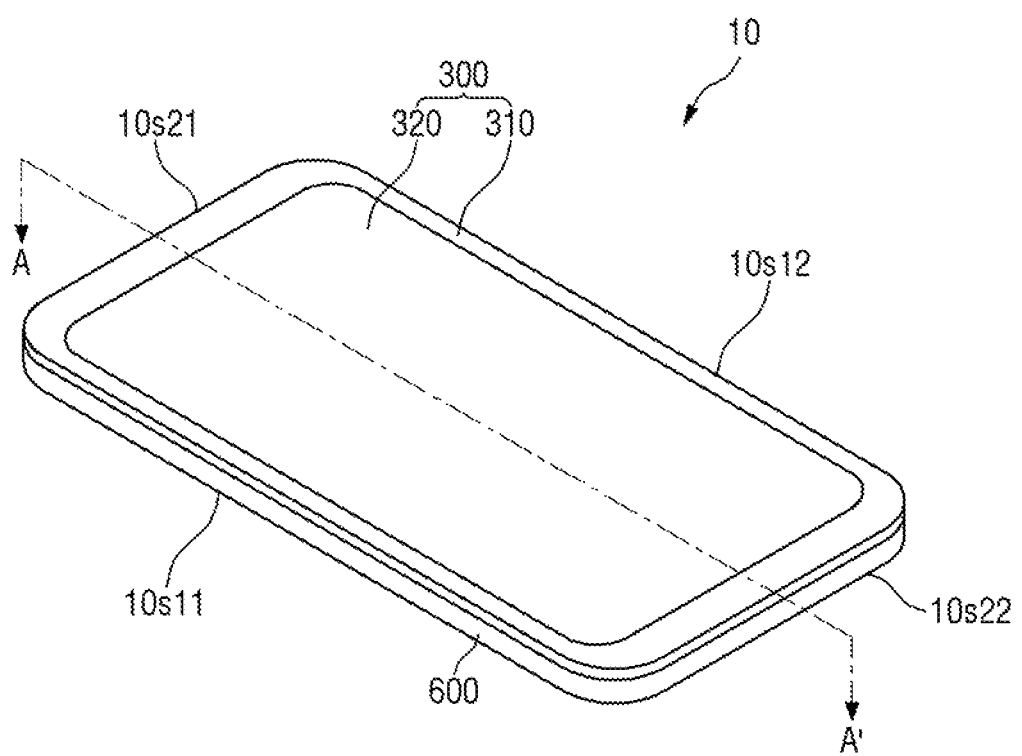
FIG. 1 is a perspective view illustrating a display device according to an exemplary embodiment of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

However, the invention is not limited to the embodiments disclosed hereinafter, but can be implemented in diverse forms. The matters defined in the description, such as the detailed construction and elements, are provided to assist those of ordinary skill in the art in a comprehensive understanding of the invention.

Where an element is described as being related to another element such as being "on" another element or "located on" a different layer or a layer, includes both a case where an element is located directly on another element or a layer and a case where an element is located on another element via another layer or still another element.

In the description of the invention, the same drawing reference numerals may be used to refer to the same elements or corresponding elements across various figures.

Figure 2:
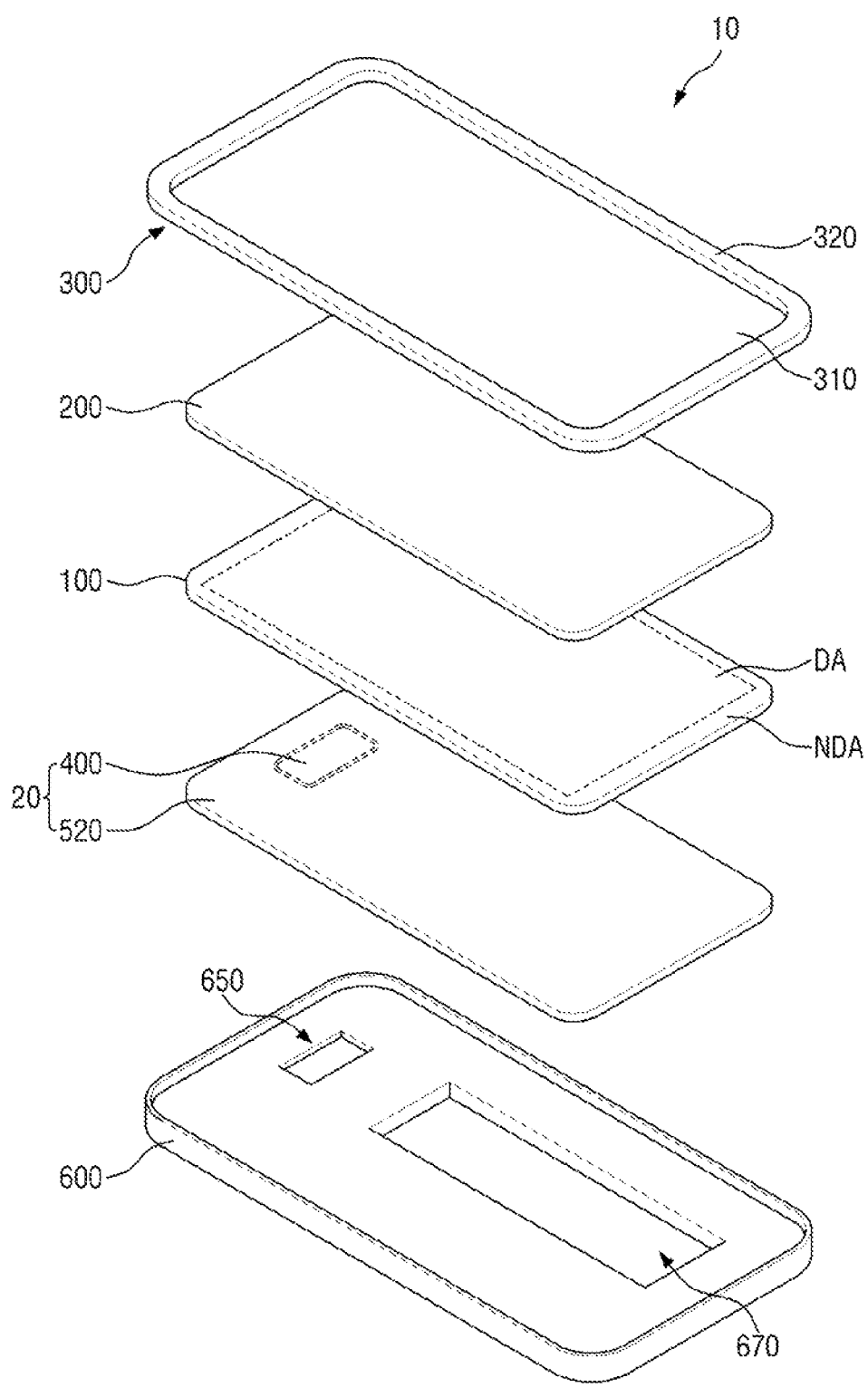
FIG. 2 is an exploded perspective view illustrating the display device of FIG. 1.
Figure 3:
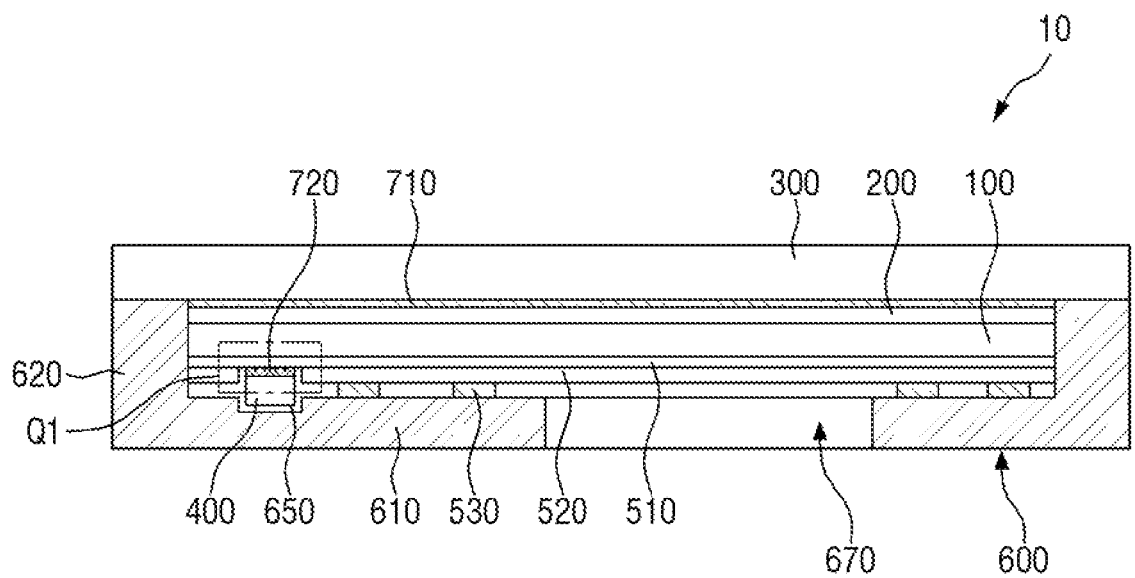
FIG. 3 is a cross-sectional view taken along line A-A' of FIG. 1.
Figure 4:
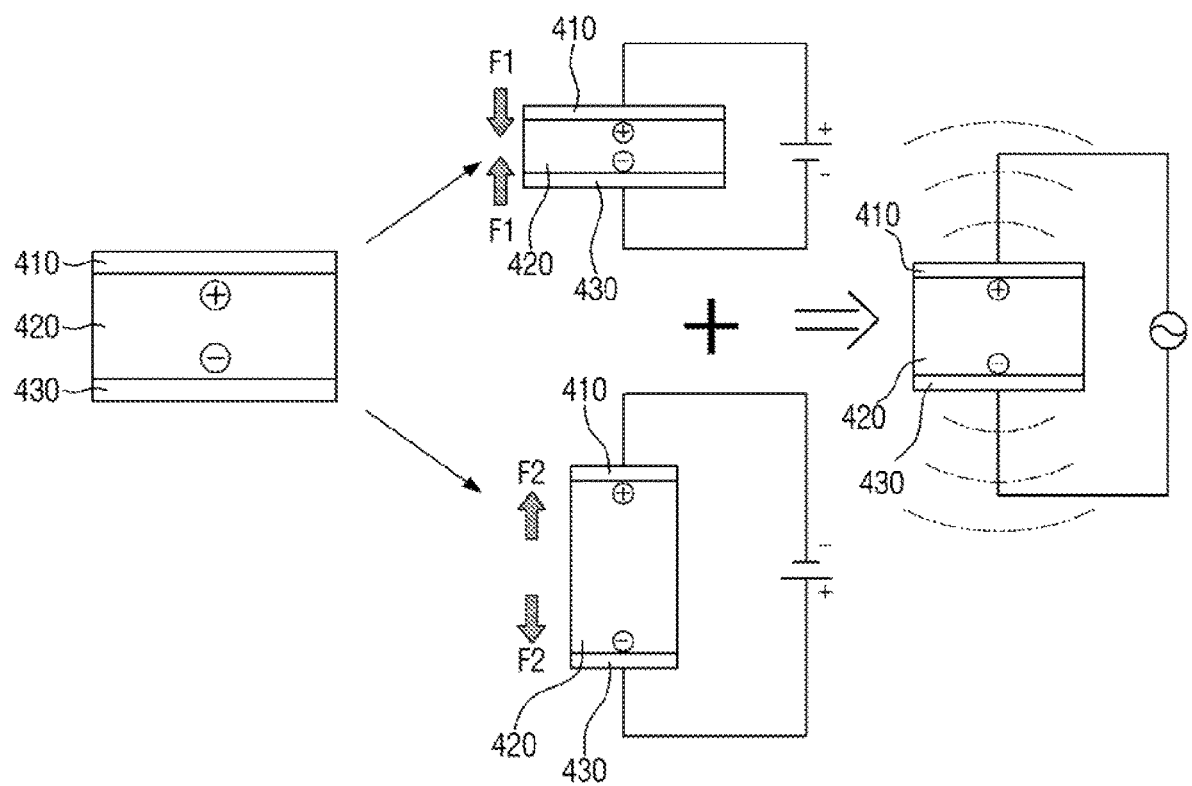
FIG. 4 is a schematic view illustrating a vibration acoustic device included in the display device of FIG. 1.
Figure 5:
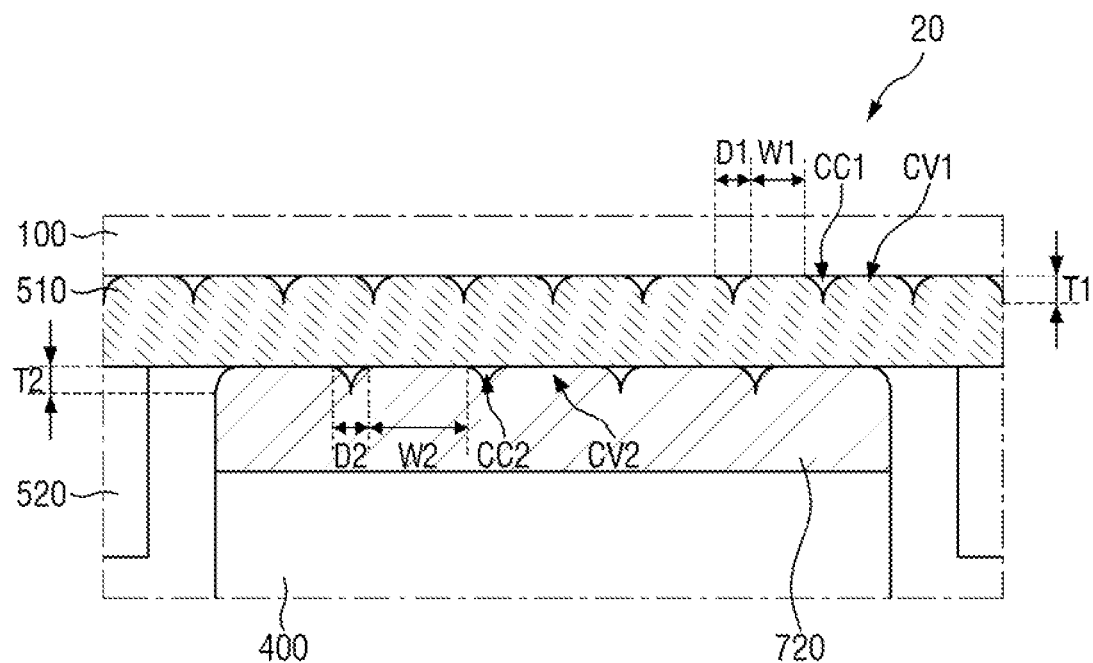
FIG. 5 is an enlarged cross-sectional view illustrating a part Q1 of FIG. 3.
Figure 6:
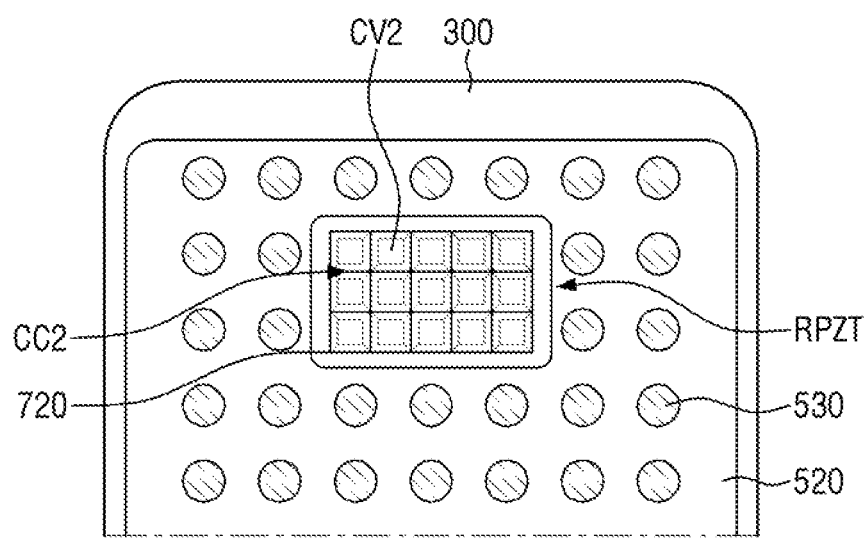
FIG. 6 is a plan view illustrating a bonding member and a bottom bonding layer included in the display device of FIG. 1.

FIG. 1 is a perspective view illustrating a display device according to an exemplary embodiment of the present disclosure. FIG. 2 is an exploded perspective view illustrating the display device of FIG. 1. FIG. 3 is a cross-sectional view taken along line A-A' of FIG. 1. FIG. 4 is a schematic view illustrating a vibration acoustic device included in the display device of FIG. 1. FIG. 5 is an enlarged cross-sectional view illustrating a part Q1 of FIG. 3. FIG. 6 is a plan view illustrating a bonding member and a bottom bonding layer included in the display device of FIG. 1.

Referring to FIGS. 1 through 6, a display device 10 may display an image. The display device 10 may be a mobile terminal such as a tablet computer, a smartphone, a personal digital assistant (PDA), a portable multimedia player (PMP), a gaining console, or a wearable device such as a wrist-watch-type electronic device, but the present disclosure is not limited thereto. For example, the display device 10 may be a large-size electronic device such as a television (TV) or an outdoor billboard or a mid- or small-size electronic device such as a personal computer (PC) monitor, a notebook computer, a car navigation device, or a digital camera.

The display device 10 may have a substantially rectangular shape in a plan view. The display device 10 may include two long sides (e.g., first and second long sides 10s11 and 10s12) and two short sides (e.g., first and second short sides 10s21 and 10s22). The corners where the two long sides and the two short sides of the display device 10 meet may be right-angled or may be rounded, as illustrated in FIG. 1. However, the planar shape of the display device 10 is not particularly limited, and the display device 10 may be formed in various other shapes such as a circular shape.

The display device 10 may include a display panel 100 and a panel bottom member 20, and the panel bottom member 20 may include a vibration acoustic device 400 and a buffer member 520. The display device 10 may further include a function module (or panel) 200, a window 300, and a bracket 600.

The display panel 100 may be configured to display an image. For example, the display panel 100 may be an organic light-emitting diode (OLED) display panel. In the description that follows, it is assumed that the display panel 100 is an OLED display panel, but the present disclosure is not limited thereto. For example, the display panel 100 may alternatively be a liquid crystal display (LCD) panel, an electrophoretic display (EPD) panel, or a plasma display panel (PDP).

The display panel 100 may include a plurality of OLEDs disposed on a substrate. The substrate may be a rigid substrate formed of glass or a flexible substrate formed of polyimide (PI). In a case where the substrate is a PI substrate, the display panel 100 may be bendable, foldable, or rollable. The display panel 100 may have a display area DA and a non-display area NDA disposed on the periphery of the display area DA and at least partially surrounding the display area DA.

Unless specified otherwise, the terms "upper," "top," and "top surface," as used herein, refer to a display surface's side of the display panel 100, and the terms "lower," "bottom," and "bottom surface," as used herein, refer to a side opposite to the display surface's side of the display panel 100.

The function module 200 may be disposed above the display panel 100. The function module 200 may include at least one function layer. The function layer may be a layer performing a touch sensing function, a color filtering function, a color conversion function, a polarization function, and/or a biometric information recognition function (e.g. a fingerprint recognition function). The function layer may be a sheet layer, a film layer, a thin film layer, a coating layer, a panel, and/or a plate. The function layer may consist of a single layer or may include a stack of multiple films or coating layers. For example, the function layer may be a touch sensing panel, a color filter, an optical film, and/or a fingerprint sensing panel. The function module 200 is an optional element and, may be omitted.

The window 300 may be disposed above the function module 200 (or above the display panel 100. The window 300 may be disposed so as to at least partially overlap the display panel 100 and to cover the entire display panel 100. The window 300 may be larger in size than the display panel 100. For example, the window 300 may protrude outwardly beyond the display panel 100 on both short sides of the display device 10 and/or the window 300 may also protrude outwardly beyond the display panel 100 on both long sides of the display device 10. The window 300 may protrude further beyond the display panel 100 on both short sides than on both long sides of the display device 100.

The window 300 may comprise glass, sapphire, or plastic and may be rigid, but the present disclosure is not limited thereto. For example, the window 300 may alternatively be flexible.

The window 300 may in a central part 310 and a light-shielding pattern (or decorative element) 320. The central part 310 may at least partially overlap the display area DA of the display panel 100 and may transmit light emitted from the display area DA therethrough. The light-shielding pattern 320 may be disposed along the edges of the window 300. The light-shielding pattern 320 may at least partially overlap the non-display area NDA of the display panel 100 and may prevent the non-display area NDA from being seen by a user.

The window 300 may be coupled to the function module 200 (or to the display panel 100) through a transparent bonding layer 710. The transparent bonding layer 710 may be an optically clear adhesive (OCA) or an optically cleat resin (OCR).

The panel bottom member 20 may be disposed below the display panel 100 and may be coupled to the display panel 100. The panel bottom member 20 may have substantially the same size and shape as the display panel 100 and may be disposed so as to at least partially overlap the display panel 100. The sides of the panel bottom member 20 may be aligned with the sides of the display panel 100, but the present disclosure is not limited thereto.

The panel bottom member 20 may include a light-blocking member 510, the vibration acoustic device 400, and the buffer member 520.

The light-blocking (or light-absorbing) member 510 may have substantially the same shape and size as the display panel 100 and may be disposed below the display panel 100.

The light-blocking member 510 may block the transmission of light therethrough and may prevent elements disposed therebelow (e.g., the vibration acoustic device 400, the buffer member 520, and the like) from being seen from above.

The light-blocking member 510 may have a top surface with first concave patterns CC1 and/or first convex patterns CV1 (or first embossed patterns) formed thereon.

The first concave patterns CC1 are depressed from the top surface of the light-blocking member 510. The first concave patterns CC1, like second concave patterns CC2 of a bonding member 720 of FIG. 6, may form a mesh shape or a net shape in a plan view. The second concave patterns CC1 (or the first concave patterns CC1) may individually have a rectangular shape in a plan view, but the present disclosure is not limited thereto. For example, the second concave patterns CC2 may individually have a polygonal (e.g., rectangular or hexagonal) or circular shape in a plan view.

The first concave patterns CC1 may be formed on the top surface of the light-blocking member 510 by coating an adhesive (or an adhesive layer for forming the top surface of the light-blocking member 510) on a release film having convex patterns corresponding to the first concave patterns CC1 and laminating and drying the substrate of the light-blocking member 510 on the release film. The release film may be removed when bonding the light-blocking member 510 to the display panel 100.

Due to the presence of the first concave patterns CC1, a first air passage may be formed between the display panel 100 and the light-blocking member 510 (or between the top surface and the bottom surface of the light-blocking member 510). Then, bubbles generated between the display panel 100 and the light-blocking member 510 in the process of attaching the light-blocking member 510 to the display panel 100 may be released through the first air passage. The first concave patterns CC1 may collapse over time, and as a result, the top surface of the light-blocking member 510 may become generally flat.

The structure of the light-blocking member 510 will be described later in detail with reference to FIG. 11.

The vibration acoustic device 400 (or a vibrator or an actuator) may generate vibration in response to an acoustic signal. The vibration acoustic device 400 may include a piezoelectric device having a vibration material layer.

As illustrated in FIG. 4, the vibration acoustic device 400 may include a first electrode 410, a second electrode 430, and a vibration material layer 420. The second electrode 430 may be disposed to face the first electrode 410, and the vibration material layer 420 may be interposed between the first and second electrodes 410 and 430.

The first and second electrodes 410 and 430 may each comprise a conductive material. For example, the first and second electrodes 410 and 430 may each comprise a transparent conductor such as indium tin oxide (ITO) or indium zinc oxide (IZO), an opaque metal, a conductive polymer, or carbon nanotubes (CNTs).

The vibration material layer 420 may comprise a piezoelectric material that vibrates in response to an electric field. For example, the vibration material layer 420 may comprise a piezoelectric body such as lead zirconate Innate (PZT), a piezoelectric film such as a polyvinylidene fluoride (PVDF) film, and/or an electroactive polymer.

The vibration material layer 420 may be compressed or relaxed according to the polarity of a voltage applied thereto. For example, as illustrated in FIG. 4, when a positive voltage is applied to the first electrode 410 and a negative voltage is applied to the second electrode 430, a compressive force F1 generated in the vibration material layer 420 so that the vibration material layer 420 can be compressed in its thickness direction. When a negative voltage is applied to the first electrode 410 and a positive voltage is applied to the second electrode 430, a relaxation force F2 is generated in the vibration material layer 420 so that the vibration material layer 420 can be expanded in its thickness direction. Accordingly, when an alternating voltage whose polarity alternately changes is applied to the first and second electrodes 410 and 430, the vibration material layer 420 can be repeatedly shrunk and expanded. Due to this phenomenon, vibration may be caused in the display panel 100, which is adjacent to the vibration acoustic device 400. These vibrations may be controlled, by the application of the voltage, so as to produce a desired sound. The display panel 100 may thereby serve as a diaphragm of a speaker. For example, sound can be generated by changes in the pressure of the air, caused by the vibration, of the display panel 100. When an OLED display panel is used as the display panel 100, sound can be generated without vibrations causing screen distortions.

Generally, the larger the size of a diaphragm of a speaker, the higher the pressure of sound output from the diaphragm is, and the better the output characteristics of the speaker in a low frequency range is. When the display panel 100, which accounts for a relatively large portion of the display device 10, is used as a diaphragm, a larger diaphragm area can be secured than when a separate diaphragm is provided in the display device 10, and as a result, the display device 10 can provide excellent sound and excellent output characteristics, particularly, in a low frequency range. When the display panel 100 is used as a diaphragm, there is no need to provide a separate speaker within the display device. Thus, the size of the display device 10 can be reduced, and the structure of the display device 10 can be simplified.

In the description that follows, it is assumed that the vibration acoustic device 400 includes a piezoelectric device, but the present disclosure is not limited thereto. For example, the vibration acoustic device 400 may alternatively include a permanent magnet and coils wound around the permanent magnet so as to flow a current corresponding to an acoustic signal through the coils and produce desired acoustic vibrations thereby.

The bonding member 720 may be disposed between the light-blocking member 510 and the vibration acoustic device 400. The vibration acoustic device 400 may be coupled to the light-blocking member 510 (or to the display panel 100) through the bonding member 720.

The bonding member 720 may include a double-sided adhesive tape. The bonding member 720 may comprise the same material as, or a different material from, the top surface of the light-blocking member 510.

As the flatness of the vibration acoustic device 400 decreases (or the roughness of the top surface of the vibration acoustic device 400 increases), or as the ductility of the light-blocking member 510 or the display panel 100 to which the bonding member 720 is coupled decreases, the bonding member 720 may become thicker. For example, the thickness of the bonding member 720 may be within a range of 30 µm to 180 µm, 60 µm to 120 µm, or 90 µm to 180 µm, inclusive. In this example, the thickness of the light-blocking member 510 may be ⅓ to ½ of the thickness of the bonding member 720. For example, if the bonding member 720 has a thickness within a range of 90 µm to 180 µm, the light-blocking member 510 may have a thickness within a range of 30 µm to 60 µm, but the present disclosure is not limited thereto.

The second concave patterns CC2 and/or second convex patterns CV2 (or second embossed patterns) may be formed on the top surface of the bonding member 720. Similarly to the first concave patterns CC1, the second concave patterns CC2 may be depressed from the top surface of the bonding member 720. As illustrated in FIG. 6, the second concave patterns CC2 may form a mesh shape or a net shape in a plan view.

Due to the presence of the second concave patterns CC2, a second air passage may be firmed between the light-blocking member 510 and the vibration acoustic device 400 (or between the top surface and the bottom surface of the bonding member 720). Then, bubbles generated between the light-blocking member 510 and the vibration acoustic device 400 in the process of attaching the vibration acoustic device 400 to the light-blocking member 510 (or to the display panel 100 with the light-blocking member 510 attached thereon) may be released through the second air passage.

The second concave patterns CC2 of the bonding member 720 may differ from the first concave patterns CC1 of the light-blocking member 510.

The cross-sectional area (or the volume per unit area) of the second air passage formed by the second concave patterns CC2 of the bonding member 720 may be greater than the cross-sectional area (or the volume per unit area) of the first air passage formed by the first concave patterns CC1 of the light-blocking member 510.

According to an exemplary embodiment of the present disclosure, the surface area of the second air passage formed by the second concave patterns CC2 of the bonding member 720 (or the surface area of an upper part of the second air passage that is in contact with the light-blocking member 510) may be greater than the surface area of the first air passage formed by the first concave patterns CC1 of the light-blocking member 510 (or the surface area of an upper part of the first air passage that is in contact with the display panel 100).

For example, the surface area of the second air passage formed by the second concave patterns CC2 of the bonding member 720 (or the surface area of the upper part of the second air passage that is in contact with the light-blocking member 510) may be within a range of 10% to 30%, 10% to 20%, or 20% to 30% of the total area of the top surface of the bonding member 720. In this example, the surface area of the first air passage formed by the first concave patterns CC1 of the light-blocking member 510 (or the surface area of the upper part of the first air passage that is in contact with the display panel 100) may be 10% or less, or 20% or less, of the total area of the top surface of the light-blocking member 510.

According to an exemplary embodiment of the present disclosure, a second depth T2 of the second concave patterns CC2 (or of the second convex patterns CV2) in the thickness direction of the bonding member 720 may be greater than a first depth T1 of the first concave patterns CC1 (or of the first convex patterns CV1).

For example, the second depth T2 of the second concave patterns CC2 may be within a range of 1.3 to 3 times, 1.5 to 2 times, or 1.3 to 1.5 times the first depth T1 of the first concave patterns CC1. For example, the second depth T2 of the second concave patterns CC2 may be within a range of 4 μm to 15 μm, 4 μm to 8 μm, or 8 μm to 15 μm in consideration of the thickness of the bonding member 720. The first depth T1 of the first concave patterns CC1 may be smaller than the second depth T2 of the second concave patterns CC2. For example, if the second depth T2 of the second concave patterns CC2 is 12 μm, the first depth T1 of the first concave patterns CC1 may be within a range of 4 μm to 6 μm.

A second width D2 of the second concave patterns CC2 (e.g., the width of the second concave patterns CC2 in a direction parallel to the bonding member 720) may be the same as, or smaller than, a first width D1 of the first concave patterns CC1. Accordingly, the cross-sectional area (or volume) of the second air passage formed by the second concave patterns CC2 may be greater than the cross-sectional area (or volume) of the first air passage formed by the first concave pattern CC1.

According to an exemplary embodiment of the present disclosure, the second width D2 of the second concave patterns CC2 of the bonding member 720 may be greater than the first width D1 of the first concave patterns CC1 of the light-blocking member 510.

For example, the second width D2 of the second concave patterns CC2 of the bonding member 720 may be within a range of 5% to 15% of a width W2 of the second convex patterns CV2 of the bonding member 720, which are defined by the second concave patterns CC2 and protrude upwardly beyond the second concave patterns CC2, or may be within a range of 5% to 15% of the distance between the second concave patterns CC2. For example, the width W2 of the second convex patterns CV2 (or the distance between the second concave patterns CC2) may be within a range of 150 μm to 800 μm, 150 μm to 250 μm, or 400 μm to 800 μm, and the second width D2 of the second concave patterns CC2 may be within a range of 4 μm to 15 μm, 4 μm to 8 μm, or 8 μm to 15 μm.

For example, the first width D1 of the first concave patterns CC1 of the light-blocking member 510 may be 5% or less of the first width W1 of the first convex patterns CV1 of the light-blocking member 510, which are defined by the first concave patterns CC1 and protrude upwardly beyond the first concave patterns CC1, or may be 5% or less of the distance between the first concave patterns CC1. For example, the width W1 of the first convex patterns CV1 (or the distance between the first concave patterns CC1) may be within a range of 150 μm to 200 μm, and the first width D1 of the first concave patterns CC1 may be within a range of 3 μm to 6 μm.

Accordingly, the cross-sectional area of the second air passage formed by the second concave patterns CC2 may be greater than the cross-sectional area of the first air passage formed by the first concave patterns CC1.

The bottom surface of the display panel 100 may be relatively flat, and the light-blocking member 510 may be relatively flexible. Accordingly, even if the display panel 100 to which the window 300 is coupled is rigid, only a relatively small amount of bubbles can be generated in the display panel 100 when the light-blocking member 510 is coupled or attached to the display panel 100. Then, the generated bubbles can be properly released through the first air passage even if the first air passage is relatively narrow.

The top surface of the vibration acoustic device 400 may be relatively rough (e.g., the flatness of the top surface of the vibration acoustic device 400 may be lower than the flatness of the bottom surface of the display panel 100), and the vibration acoustic device 400 may be rigid. When the light-blocking member 510 alone or the light-blocking member 510 attached to the display panel 100 is coupled to the vibration acoustic device 400 (e.g., when two objects that are relatively rigid and have uneven surfaces are coupled), a relatively large amount of bubbles can be generated. However, since the first air passage can be formed to be relatively wide due to the presence of the second concave patterns CC2 of the bonding member 720, bubbles generated between the light-blocking member 510 and the vibration acoustic device 400 can be effectively released through the first air passage. Thus, even if separate vacuum equipment is not used, the vibration acoustic device 400 can be coupled to the light-blocking member 510, without causing bubbles, through the bonding member 720 with the second concave patterns CC2 formed thereon.

Since the shape of the second concave patterns CC2 of the bonding member 720 can be maintained over time, bubbles that remain unreleased between the light-blocking member 510 and the vibration acoustic device 400 (e.g., bubbles that are generated when coupling the vibration acoustic device 400 and the light-blocking member 510 and fail to be released) can be properly released during use of the display device 10. Accordingly, any defects that may be caused by bubbles (e.g., a phenomenon in which bubbles become visible on the screen or the generation of zebra patterns on the screen due to bubbles) can be prevented.

The buffer member 520 prevents damage to the display panel 100, the window 300, and the like by absorbing external shock. The buffer member 520 may consist of a single layer or a stack of multiple films or coating layers. For example, the buffer member 520 may be formed of a polymer resin such as polyurethane (PU), polycarbonate (PC), polypropylene (PP), or polyethylene (PE) or may comprise an elastic material such as a foam rubber sponge, a urethane-based material, or an acrylic material. The buffer member 520 may be a cushion layer.

The buffer member 520 might not overlap the vibration acoustic device 400. Since the buffer member 520 may be formed of an elastic material and might not overlap the vibration acoustic device 400, vibration generated by the vibration acoustic device 400 can be transmitted to the display panel 100 without being absorbed by the buffer member 520.

The bracket 600 may be disposed below the display panel 100 and the panel bottom member 20 (or below the vibration acoustic device 400 and the buffer member 520).

The bracket 600 may be a container for receiving and protecting various parts and elements of the display device 10 therein. For example, the bracket 600 may receive the function module 200, the display panel 100, and the panel bottom member 20 therein.

The bracket 600 may be formed of a synthetic resin material, a metal material, or a combination of different materials.

The bracket 600 may be partially exposed on the sides of the display panel 10 to form the exterior side of the display device 10. An external housing may be coupled to the bottom of the bracket 600, but the present disclosure is not limited thereto. For example, the bracket 600 may alternatively be provided as the external housing of the display device 10.

The bracket 600 may include a bottom portion 610 and sidewalls 620. The top surface of the bottom portion 610 may face the bottom surfaces of the vibration acoustic device 400 and the buffer member 520. The sidewalls 620 of the bracket 620 may face the sides of the function module 200, the sides of the display panel 100, and the sides of the buffer member 520. The tops of the sidewalls 620 may face the window 300. The outer sides of the bracket 600 may be aligned with the outer sides of the window 300. The window 300 may be attached to the bracket 600 through a waterproof tape.

The sidewalls 620 of the bracket 600 may be disposed outside the outer sides of the window 300, and the sides of the bracket 600 may face the outer sides of the window 300.

The bottom portion 610 may include a recess 650 corresponding to the vibration acoustic device 400. In a case where the vibration acoustic device 400 protrudes downwardly beyond the buffer member 520, the vibration acoustic device 400 may be received in the recess 650 of the bottom portion 610. The bottom surface and the sides of the vibration acoustic device 400 may be spaced apart from the top surface of the bottom portion 610, including the recess 650, so that a space can be secured for the vibration of the vibration acoustic device 400. However, the present disclosure is not limited to this particular configuration. For example, the bottom surface and/or the sides of the vibration acoustic device 400 may alternatively be partially in contact with the recess 650 or may alternatively be coupled to the recess 650 by a double-sided tape.

The bottom surface of the bottom portion 610 may be flat. Thus, a part of the bottom portion 610 where the vibration acoustic device 400 is disposed, e.g., the thickness of a part of the bottom portion 610 where the recess 650 is formed, may be thinner than the rest of the bottom portion 610. The thickness of the bottom portion 610 may be uniform in areas other than the area where the vibration acoustic device 400 is disposed.

The bottom portion 610 of the bracket 600 may further include a hole penetrating the bottom portion 610 in the thickness direction of the bottom portion 610. For example, the bottom portion 610 of the bracket 600 may further include a battery hole 670 in which a battery is inserted. The battery bole 670 may be formed in the middle part of the bottom portion 610 of the bracket 600. The battery hole 670 may at least partially overlap the buffer member 620. For example, the buffer member 520 may be removed from an area corresponding to the recess 650, and may be formed in an area corresponding to the battery hole 670 to cover the battery hole 670.

The buffer member 520 may further include a top bonding layer and a bottom bon ding layer 530. The buffer member 520 may, be fixed to the display panel 100 through the top bonding layer and the buffer member 520 may be fixed to the bracket 600 through the bottom bonding layer 530, The buffer member 520, together with the bottom buntline layer 530 and the light-blocking member 510 may form a single element 500.

Each of the top bonding layer and the bottom bonding layer 530 may include an adhesive layer or a resin layer. For example, each of the top bonding layer and the bottom bonding layer 530 may comprise a silicone-based polymer, a urethane-based polymer, a silicone-urethane hybrid polymer, an acrylic polymer, an isocyanate polymer, a polyvinyl alcohol polymer, a gelatin polymer, a vinyl polymer, a latex polymer, a polyester polymer, and/or a water-based polyester polymer.

The bottom bonding layer 530 may be disposed below the buffer member 520. For example, the bottom bonding layer 530 may have a thickness within a range of 60 μm to 120 μm, but the present disclosure is not limited thereto. The bottom bonding layer 530 may be disposed to expose at least part of the bottom surface of the buffer member 520.

As illustrated in FIGS. 3 and 6, the bottom bonding layer 530 may have island patterns that are isolated from one another. The bottom bonding layer 530 might not overlap the recess 650 and the battery hole 670 of the bottom portion 610 of the bracket 600 and may be arranged at a uniform density in areas other than the areas where the recess 650 and the battery hole 720 are formed. The island patterns of the bottom bonding layer 530 may have a circular shape, but the present disclosure is not limited thereto. For example, the island patterns of the bottom bonding layer 530 may alternatively have a rectangular shape or another polygonal shape.

The buffer member 520 and the bracket 600 may be spaced apart from each other in areas where the bottom bonding layer 530 is not disposed. The areas where the bottom bonding layer 530 is not disposed (e.g., the areas where the buffer member 520 and the bracket 600 are spaced apart from each other) are provided throughout the entire buffer member 520. Empty spaces where the bottom bonding layer 530 is not disposed may be connected to one another and may also be connected to the vibration acoustic device 400. These empty spaces may become resonant spaces that can serve as the sound box of a speaker and may amplify sound generated by the vibration acoustic device 400. Since the entire areas where the bottom bonding layer 530 is not disposed can be used as resonant spaces, a sufficiently large resonant space can be configured as compared to the size of the entire display device 10. When the empty spaces where the bottom bonding layer 530 is not disposed are connected to the battery hole 670, the empty space inside the battery hole 670 (or the space between the buffer member 520 and a battery installed in the battery hole 670) may also be used as a resonant space, and the sound can be further amplified.

As described above, since the panel bottom member 20 includes the vibration acoustic device 400, the display device 10 can be equipped with a sound-producing function.

The vibration acoustic device 400 can be coupled to the light-blocking member 510 (or to the display panel 100), without causing bubbles and without the aid of additional vacuum equipment, through the bonding member 720 with the second concave patterns CC2 formed thereon.

Since the shape of the second concave patterns CC2 (or the shape of the second embossed patterns) of the bonding member 720 can be maintained over time, bubbles that remain unreleased between the bonding member 720 and the light-blocking member 510 can be released through the second air passage formed by the second concave patterns CC2, and as a result, defects that may be caused by bubbles can be prevented.

Since the bottom bonding layer 530 has island patterns and couples the bracket 600 to the buffer member 520 while leaving empty spaces between the bracket 600 and the buffer member 520, a large resonant space can be formed by spatially connecting the empty spaces between the bracket 600 and the buffer member 520, and as a result, the sound-producing function of the display device 10 can be made more effective.

Figure 7:
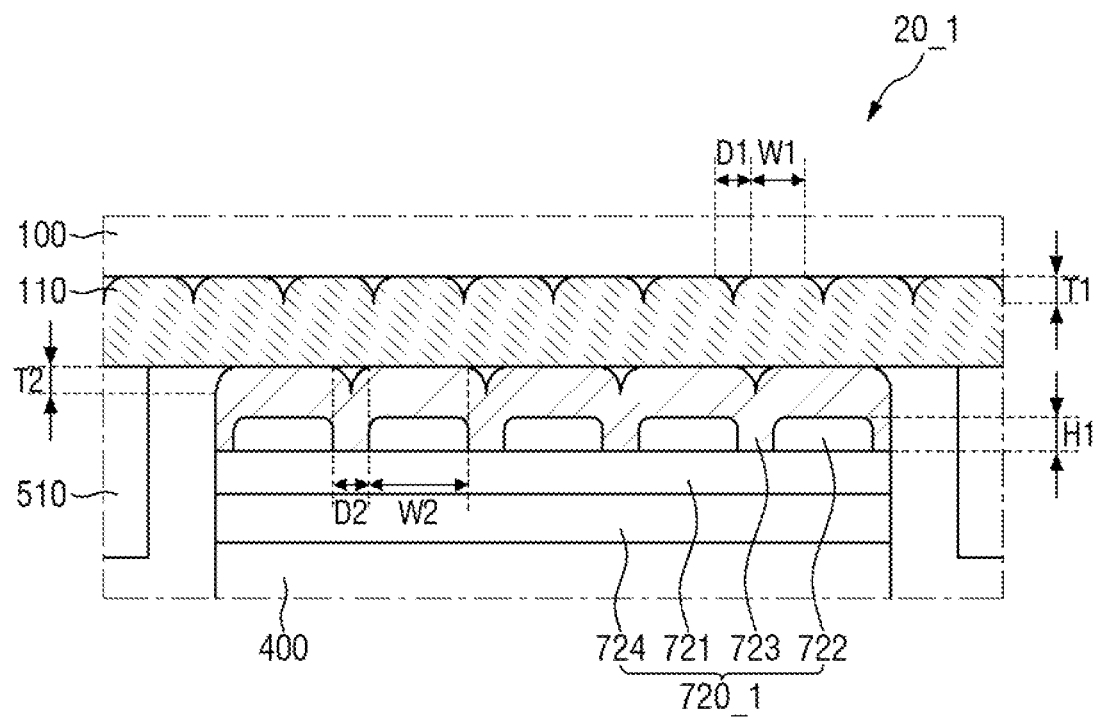
FIG. 7 is a cross-sectional view illustrating an exemplary panel bottom member.
Figure 8A:
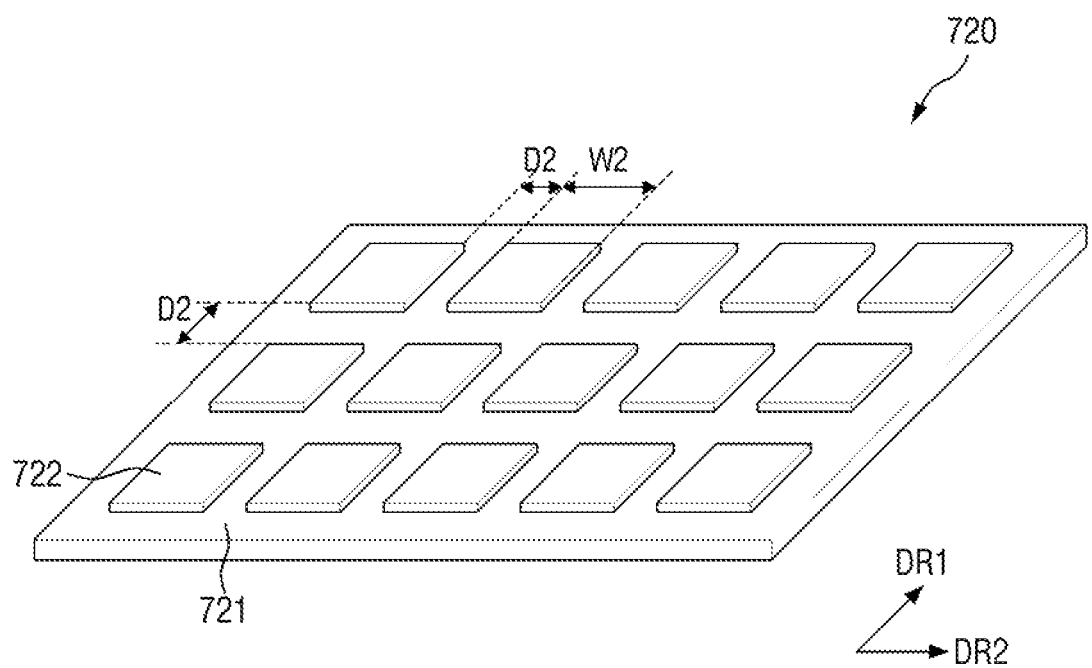
FIGS. 8A through 8C are perspective views of various exemplary bonding members that can be included in the panel bottom member of FIG. 7.
Figure 8B:
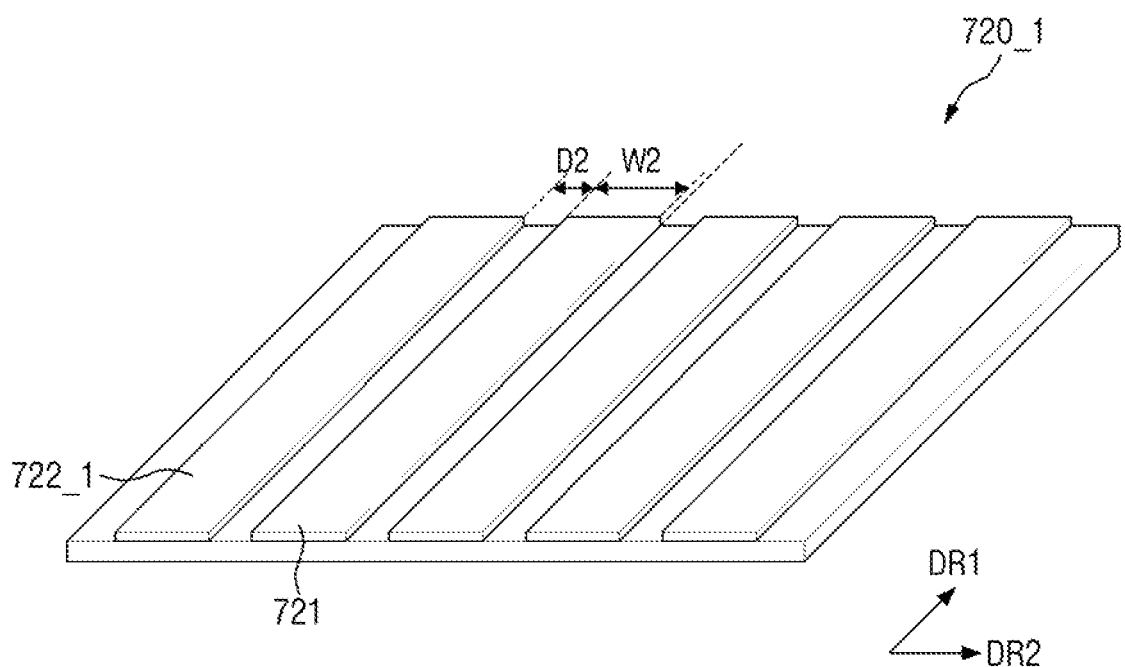
Figure 8C:
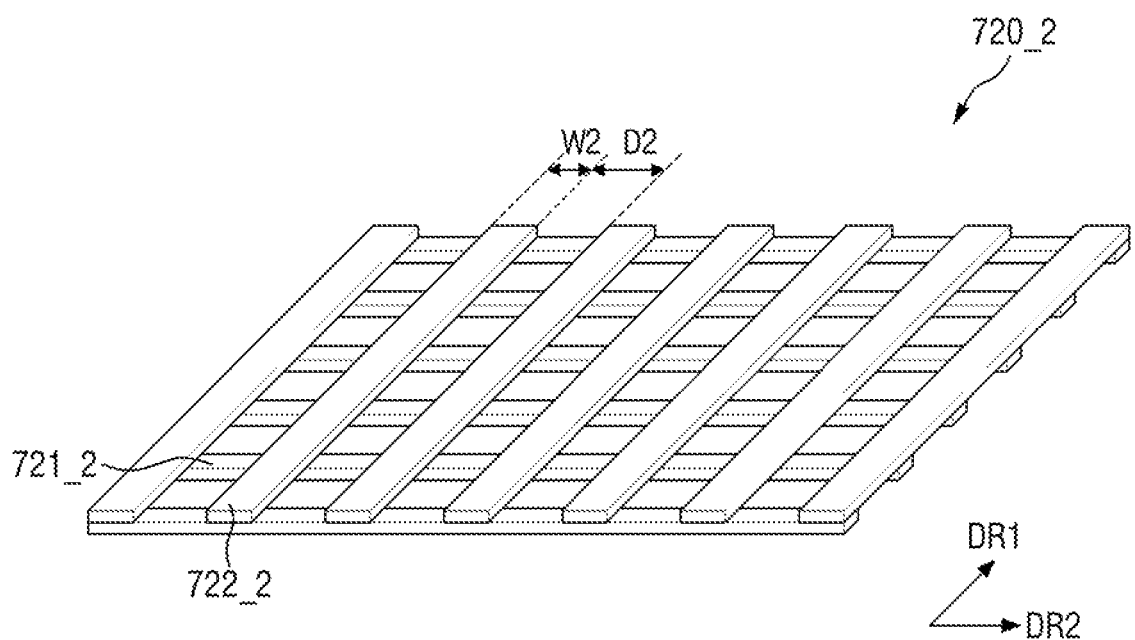

FIG. 7 is a cross-sectional view of an exemplary panel bottom member. FIGS. 8A through 8C are perspective views of various exemplary bonding members that can be included in the panel bottom member of FIG. 7.

Referring to FIGS. 7 and 8A, a panel bottom member 20_1 differs from the panel bottom member 20 of FIG. 5 in that the panel bottom member 20_1 of FIGS. 7 and 8A includes a bonding member 720_1.

The bonding member 720_1 may include a substrate 721, a first bonding layer 723, and a second bonding layer 724. The bonding member 720_1 may further include convex patterns 722.

As illustrated in FIG. 8A, the substrate 721 may have a plate shape. The substrate 721 may be formed of a flexible polymer material such as polyethylene terephthalate (PET), PI, PC, PE, PP, polysulfone (PSF), polymethyl methacrylate (PMMA), triacetyl cellulose (TAC), and/or a cycloolefin polymer (COP).

The convex patterns 722 may be disposed on the substrate 721 and may be arranged at intervals of a predetermined distance (e.g., having a first width D1) in a matrix form. The convex patterns 722 may have a rectangular shape in a plan view to correspond to second concave patterns CC2 (or second convex patterns CV2), but the present disclosure is not limited thereto. For example, the convex patterns 722 may alternatively have a circular shape, a triangular shape, or another polygonal shape in a plan view. The width of the convex patterns 722 may be the same as, or smaller than, a width W2 of the second convex patterns CV2. The distance between the convex patterns 722 may be the same as, or greater than, a second width D2 of the second concave patterns CC2. A height of the convex patterns 722 may be the same as, or greater than a second depth T2 of the second concave patterns CC2.

The convex patterns 722 may comprise the same material as the substrate 721. For example, the convex patterns 722 may be formed as one integral body with the substrate 721.

The first bonding layer 723 may be disposed above (or on the top surfaces of) the substrate 721 and the convex patterns 722 and may include an adhesive layer or a resin layer. For example, the first bonding layer 723 may comprise a silicone-based polymer, a urethane-based polymer, a silicone-urethane hybrid polymer, an acrylic polymer, an isocyanate polymer, a polyvinyl alcohol polymer, a gelatin polymer, a vinyl polymer, a latex polymer, a polyester polymer, and/or a water-based polyester polymer.

The first bonding layer 723 may be uniformly applied or coated on the substrate 721 and may have embossed patterns or first convex patterns CV1 and first concave patterns CC1) due to the presence of the convex patterns 722. The shape of the embossed patterns of the first bonding layer 723 (or of the bonding member 720_1) can be maintained over time due to the presence of the convex patterns 722.

The second bonding layer 724 may be disposed below or on the bottom surface of) the substrate 721 and may comprise one of the above-mentioned examples of the material of the first bonding layer 723.

FIG. 8A illustrates the convex patterns 722 as being island patterns, but the present disclosure is not limited thereto.

Referring to FIG. 8B, a bonding member 720_1 differs from the bonding member 720 of FIG. 8A in that the bonding member 720_1 of FIG. 8B includes convex patterns 722_1.

The convex patterns 722_1 may be linear patterns having a predetermined width (e.g., the width W2 of the second convex patterns CV2) and the convex patterns 722_1 may extend in a first direction DR1 and may be arranged at intervals of a predetermined distance (e.g., the second width D2) in a second direction DR2, which intersects the first direction DR1. In this case, the second air passage formed by the second concave patterns CC2 may be connected to the outside only in the first direction DR1.

Referring to FIG. 8C, a bonding member 720_2 differs from the bonding member 720 of FIG. 8A in that it includes a substrate 721_2 and convex patterns 722_2.

The substrate 721_2 may include linear patterns having, a predetermined width. (e.g., the width W2 of the second convex patterns CV2) and extending in a second direction DR2 and may be arranged at intervals of a predetermined distance (e.g., the second width D2) in a first direction DR1. The convex patterns 722_2 may be disposed on the substrate 721_2, may have a predetermined width (e.g., the width W2 of the second convex patterns CV2), may extend in the first direction DR1, and may be arranged at intervals of a predetermined distance (e.g., the second width D2) in the second direction DR2. For example, the substrate 721_2 and the convex patterns 722_2 may form a mesh structure or a fabric structure in a plan view.

As described above with reference to FIGS. 7 through 8C, the bonding member 720, 720_1, or 720_2 includes the convex patterns 722, 722_1, 722_2 corresponding to the second concave patterns CC2. Accordingly, the shape of the second concave patterns CC2 can be maintained over time.

Figure 9:
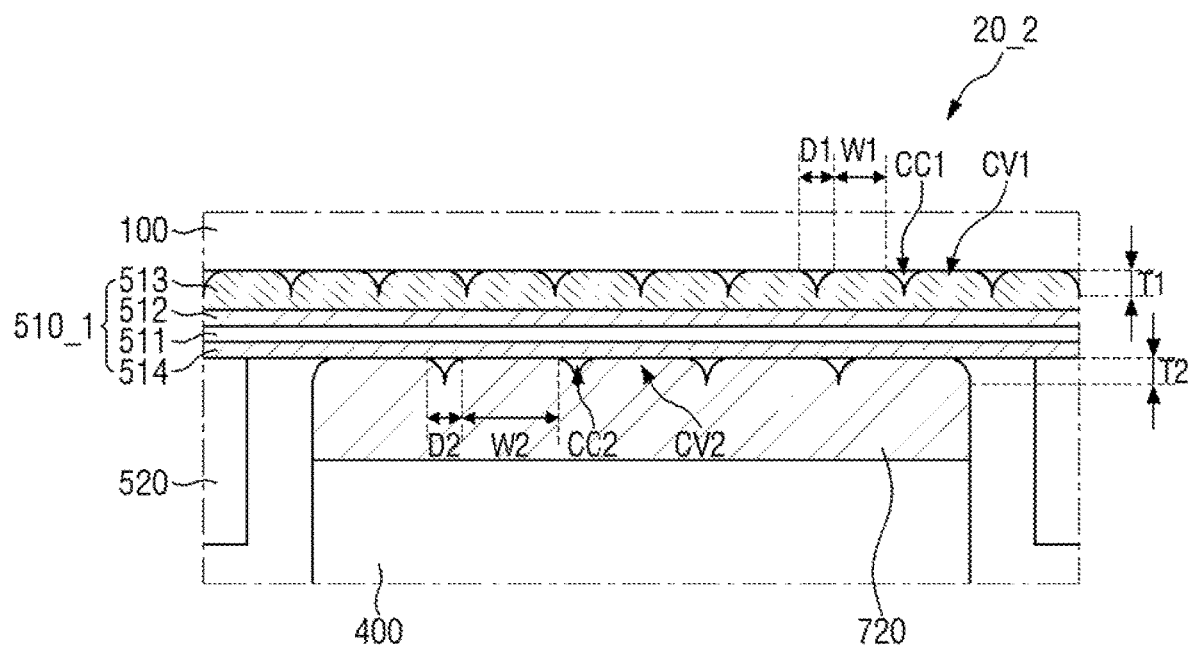
FIGS. 9 through 11 are cross-sectional views illustrating exemplary panel bottom members.
Figure 10:
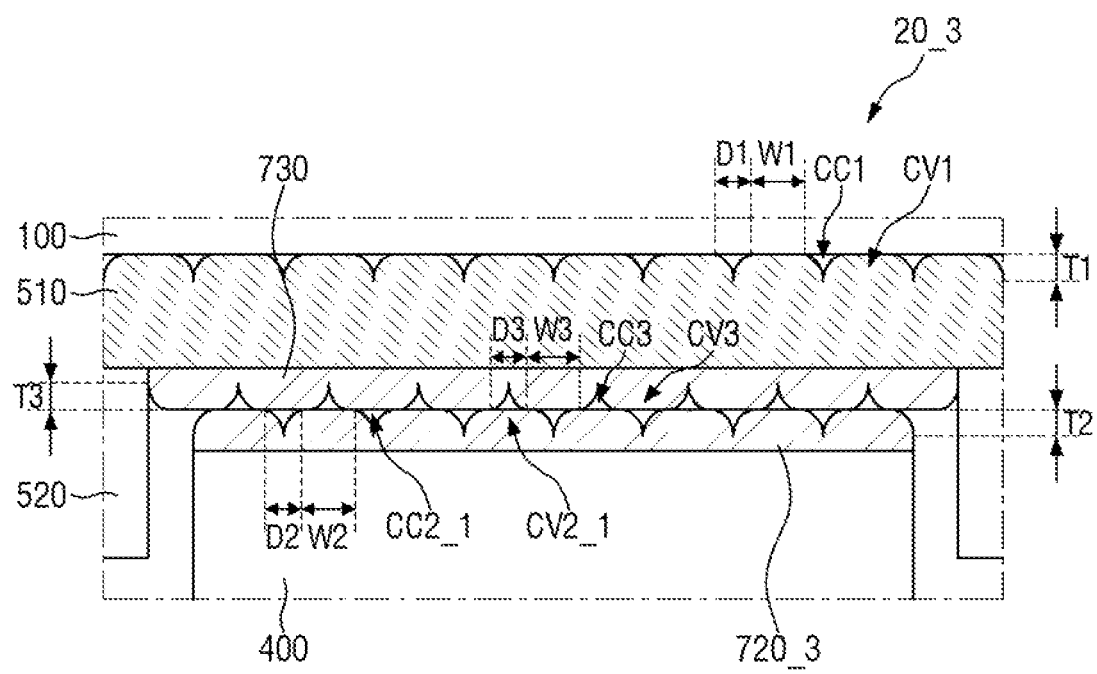
Figure 11:
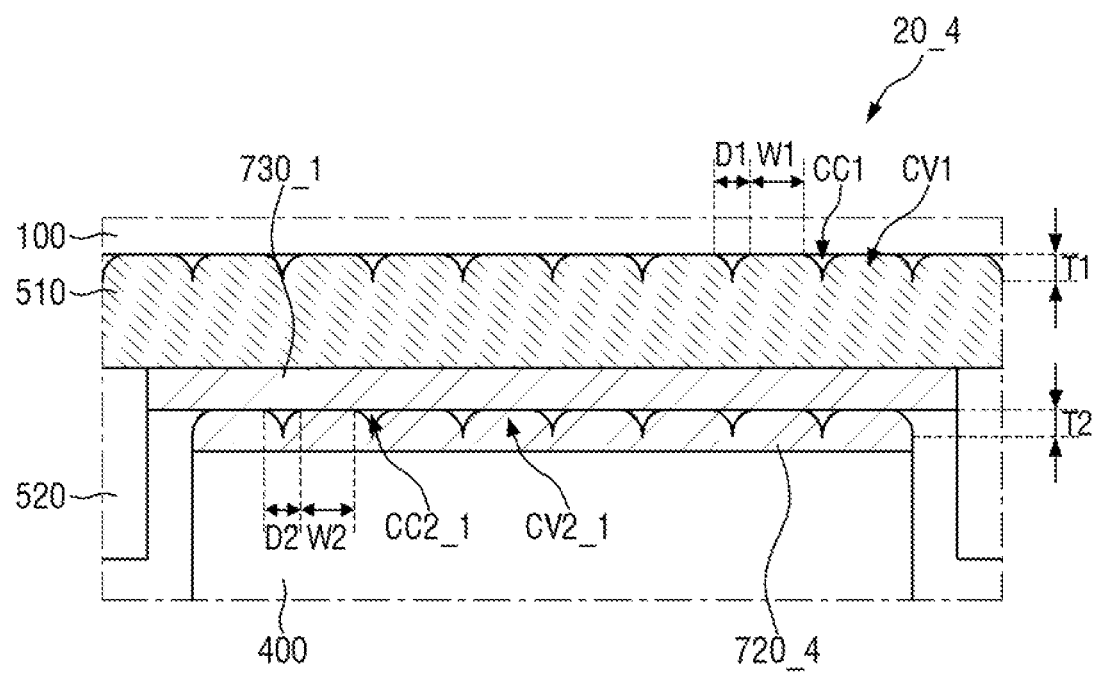
Figure 12:
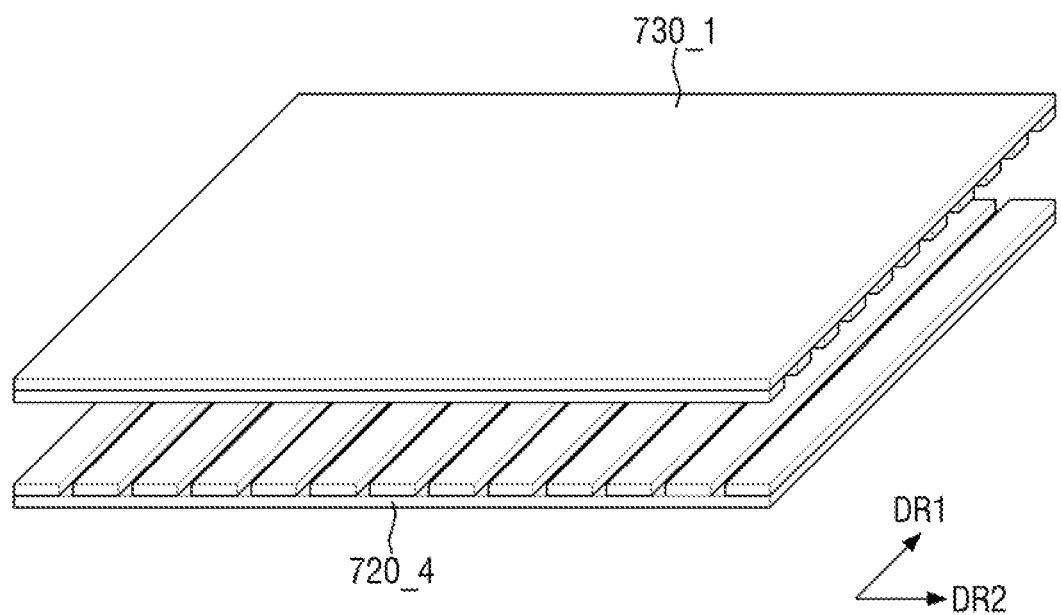
FIG. 12 is a perspective view illustrating exemplary bonding members included in the panel bottom member of FIG. 11.

FIGS. 9 through 11 are cross-sectional views of various exemplary panel bottom members. FIG. 12 is a perspective view illustrating exemplary bonding, members included in the panel bottom member of FIG. 11.

Referring to FIGS. 1, 3, 5, and 9, a panel bottom member 20_2 differs from the panel bottom member 20 of FIG. 5 in that the panel bottom member 20_2 of FIG. 9 includes a light-blocking member 510_1.

The light-blocking member 510_1 may include a substrate 511, a first light-absorbing (or light-blocking) layer 512, and an upper bonding layer 513. The light-blocking member 510_1 may further include a second light-absorbing layer 514.

The substrate 511 may be formed of PET, PI, PC, PE, PP, PSF, PMMA, TAC, and/or COP.

The first light-absorbing layer 512 may be disposed on the top surface of the substrate 511. The first light-absorbing layer 512 may be disposed directly on the top surface of the substrate 511. The first light-absorbing layer 512 may be disposed on the entire top surface of the substrate 511.

The first light-absorbing layer 512 can block the transmission of light therethrough and can thus prevent a vibration acoustic device 400 therebelow from being visible from above. The first light-absorbing layer 512 may comprise a light-absorbing material such as a black pigment or dye. For example, the first light-absorbing layer 512 may comprise black ink. The first light-absorbing layer 512 may be formed on the top surface of the substrate 511 through coating or printing.

The upper bonding layer 513 may be disposed on the top surface of the first light-absorbing layer 512 (or of the substrate 511). The upper bonding layer 513 may attach the light-blocking member 510_1 to the bottom surface of the display panel 100. The upper bonding layer 513 may include an adhesive layer or a resin layer. For example, the upper bonding layer 513 may comprise a silicone-based polymer, a urethane-based polymer, a silicone-urethane hybrid polymer, an acrylic polymer, an isocyanate polymer, a polyvinyl alcohol polymer, a gelatin polymer, a vinyl polymer, a latex polymer, a polyester polymer, or a water-based polyester polymer.

First concave patterns CC1 may be formed on the top surface of the upper bonding layer 513. As discussed above, the first concave patterns CC1 may be formed by coating an adhesive (or an adhesive for forming the upper bonding layer 513) on a release film having convex patterns corresponding to the first concave patterns CC1 and drying the adhesive. The release film may be removed when bonding the light-blocking member 510_1 to the display panel 100, and the light-blocking member 510_1 may be coupled to the display panel 100 through the upper bonding layer 513.

The second light-absorbing layer 514 may be disposed on the bottom surface of the substrate 511 and may be substantially the same as the first light-absorbing layer 512. Thus, any details concerning the description of the second light-absorbing layer 514 that are omitted may be understood to be at least similar to corresponding details described above.

Referring to FIGS. 5 and 10, a panel bottom member 20_3 of FIG. 10 differs from the panel bottom member 20 of FIG. 5 in that the panel bottom member 20_3 of FIG. 10 includes first and second bonding members 720_3 and 730.

The first bonding member 720_3 of FIG. 10 differs from the bonding member 720 of FIG. 5 in that the first bonding member 720_3 includes second concave patterns CC2_1 (or embossed patterns).

A second width D2 of second concave patterns CC2_1, which are formed on the top surface of the first bonding member 720_3, the distance between the second concave patterns CC2_1 (or a width W2 of second convex patterns CV2_1), and a second depth T2 of the second concave patterns CC2_1 may be the same as a first width D1 of first concave patterns CC1, which are formed on the top surface of a light-blocking member 510, the distance between the first concave patterns CC1 (or a width W1 of first convex patterns CV1), and a first depth T1 of the first concave patterns CC1, respectively.

The second bonding member 730 may be disposed between the light-blocking member 510 and the first bonding member 720_3. Third concave patterns CC3 (and third convex patterns CV3) may be formed on the bottom surface of the second bonding member 30.

A third width D3 of the third concave patterns CC3 of the second bonding member 730, the distance between the third concave patterns CC3 (or a third width W3 of the third convex patterns CV3), and a third depth T3 of the third concave patterns CC3 may be the same as the second width D2 of the second concave patterns CC2_1, which are formed on the top surface of the first bonding member 720_3, the distance between the second concave patterns CC2_1 (or the width W2 of the second convex patterns CV2_1), and the second depth T2 of the second concave patterns CC2_1, respectively.

For example, the second bonding member 730 and the first bonding member 720_3 may be integrally formed as a single bonding member (e.g., a double-sided adhesive tape) and may be cut (or otherwise separated) to be attached to the top surface of a vibration acoustic device 400 and the bottom surface of the light-blocking member 510, respectively, to couple the vibration acoustic device 400 and the light-blocking member 510. For example, the second bonding member 730 may be formed as one integral body with the light-blocking member 510.

The second concave patterns CC2_1 of the first bonding member 720_3 and the third concave patterns CC3 of the second bonding member 730 may form a second air passage, and the size (or the cross-sectional area) of the second air passage may be greater than the size (or the cross-sectional area) of a first air passage formed by the first concave patterns CC1 of the light-blocking member 510. Thus, even if a large amount of bubbles is generated or remains released in the process of coupling the light-blocking member 510 alone or the light-blocking member 510 coupled to the display panel 100 to the vibration acoustic device 400, the bubbles can be easily released through the first air passage.

As illustrated in FIG. 10, even if bonding members with relatively small concave patterns (or embossed patterns) formed thereon are used, the generation of bubbles in the process of coupling the light-blocking member 510 and the vibration acoustic device 400 or defects that may be caused by such bubbles can be prevented by attaching the bonding members to the bottom surface of the light-blocking member 510 and the top surface of the vibration acoustic device 400.

Referring to FIGS. 11 and 12, a panel bottom member 20_4 of FIG. 11 differs from the panel bottom member 20_3 of FIG. 10 in that the panel bottom member 20_4 of FIG. 11 includes first and second bonding members 720_4 and 730_1.

The first bonding member 720_4 may be disposed on the top surface of a vibration acoustic device 400 and may have a top surface with second concave patterns CC2_1 formed thereon. Similarly, the second bonding member 730_1 may be disposed on the bottom surface of the light-blocking member 510 and may have a bottom surface with third concave patterns CC3 formed thereon.

The first bonding member 720_4 may be substantially the same as the bonding member 720_2 of FIG. 8B. For example, the second concave patterns CC2_1 of the first bonding member 720_3 may extend in a first direction DR1 and may be arranged repeatedly in a second direction DR2.

The second bonding member 730_1 may be obtained by turning the first bonding member 720_4 upside down and rotating the first bonding member 720_4 by 90 degrees clockwise (or counterclockwise) with respect to a vertical axis (e.g., an axis perpendicular to one surface of the first bonding member 720_4). For example, the third concave patterns CC3 of the second engaging member 730_1 may extend in the second direction DR2 and may be arranged repeatedly in the first direction DR1.

The second concave patterns CC2_1 of the first bonding member 720_3 and the third concave patterns CC3 of the second bonding member 730_1 may intersect each other and may form a second air passage that is of a mesh shape.

Figure 13:
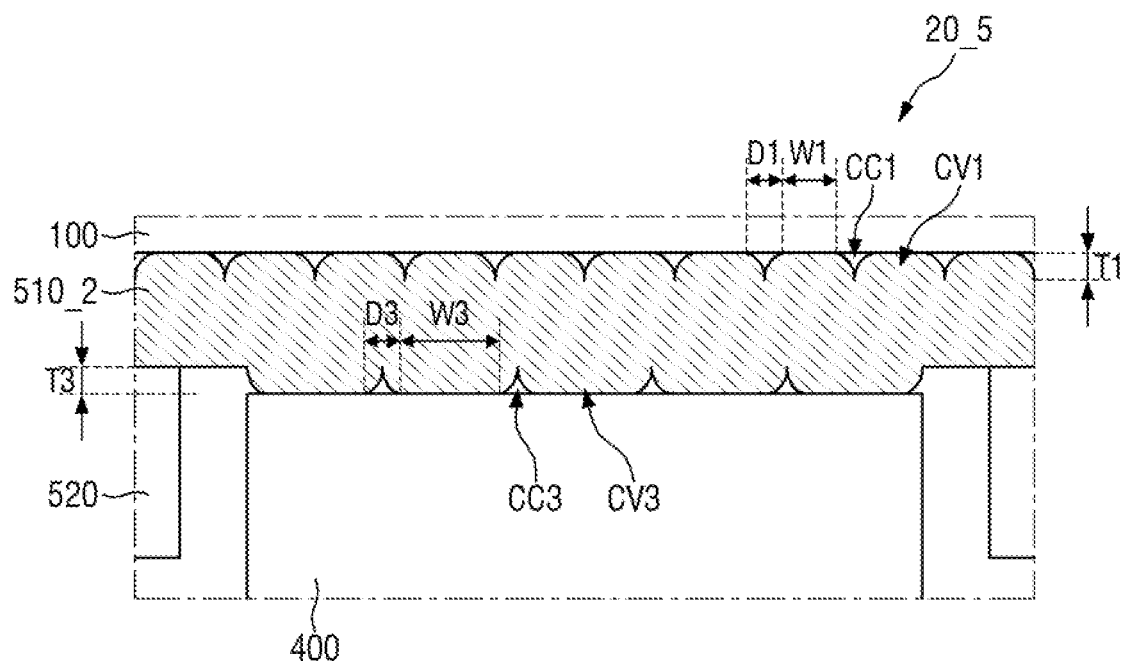
FIG. 13 is a cross-sectional view illustrating an exemplary panel bottom member.

FIG. 13 is a cross-sectional view of an exemplary panel bottom member.

Referring to FIGS. 3, 5, and 13, a panel bottom member 20_5 of FIG. 13 differs from the panel bottom member 20 of FIG. 5 in that the panel bottom member 20_5 of FIG. 13 includes a light-blocking member 510_2, but does not include the bonding member 720 of FIG. 5.

The light-blocking member 510_2 may have a bottom surface with third concave patterns CC3 formed thereon and a top surface with first concave patterns CC1 formed thereon.

The first concave patterns CC1 may be substantially the same as the first concave patterns CC1 of FIG. 5. Thus any details concerning the description thereof that are omitted may be understood to be at least similar to corresponding details described above.

The third concave patterns CC3 may be substantially the same as the second concave patterns CC2 of FIG. 5. For example, a third width D3 of the third concave patterns CC3, the distance between the third concave patterns CC3 (or a width W3 of third convex patterns CV3 defined by the third concave patterns CC3), and a third depth T3 of the third concave patterns CC3 may be substantially the same as the second width D2 of the second concave patterns CC2 of FIG. 5, the distance between the second concave patterns CC2 of FIG. 5 (or the width W2 of the second convex patterns CV2 of FIG. 5), and the second depth T2 of the second concave patterns CC2 of FIG. 5, respectively.

The third concave patterns CC3 may be formed only on a part of the bottom surface of the light-blocking member 510_2 overlapping with a vibration acoustic device 400. For example, the third concave patterns CC3 might not be formed on a part of the bottom surface of the light-blocking member 510_2 overlapping with a buffer member 520, but the present disclosure is not limited thereto. For example, concave patterns different from the third concave patterns CC3 may be formed on the part of the bottom surface of the light-blocking member 510_2 overlapping with the buffer member 520. Alternatively, in a case where a rigid function layer is disposed between the light-blocking member 510_2 and the buffer member 520, the third concave patterns CC3 may be formed on the entire bottom surface of the light-blocking member 510_2.

The bottom surface of the light-blocking member 510_2 may be adhesive, and as a result, the vibration acoustic device 400 may be coupled directly to the bottom sort ice of the light-blocking member 510_2. For example, no bonding member may be interposed between the light-blocking member 510_2 and the vibration acoustic device 400.

Figure 14:
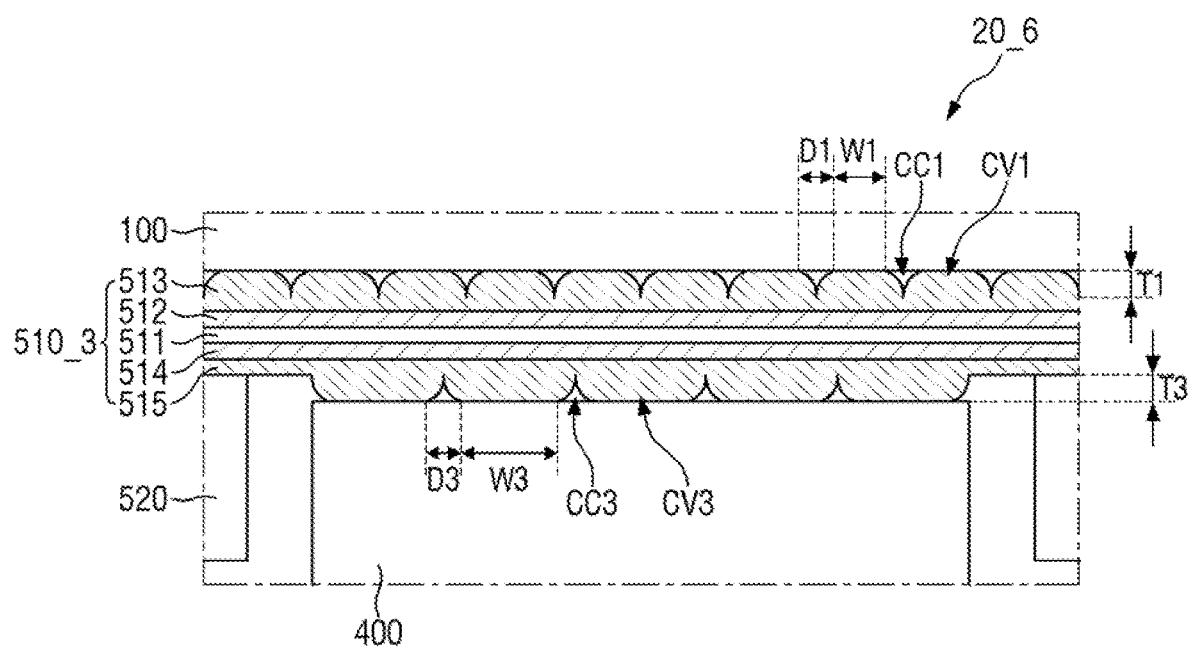
FIGS. 14 and 15 are cross-sectional views illustrating exemplary panel bottom members.
Figure 15:
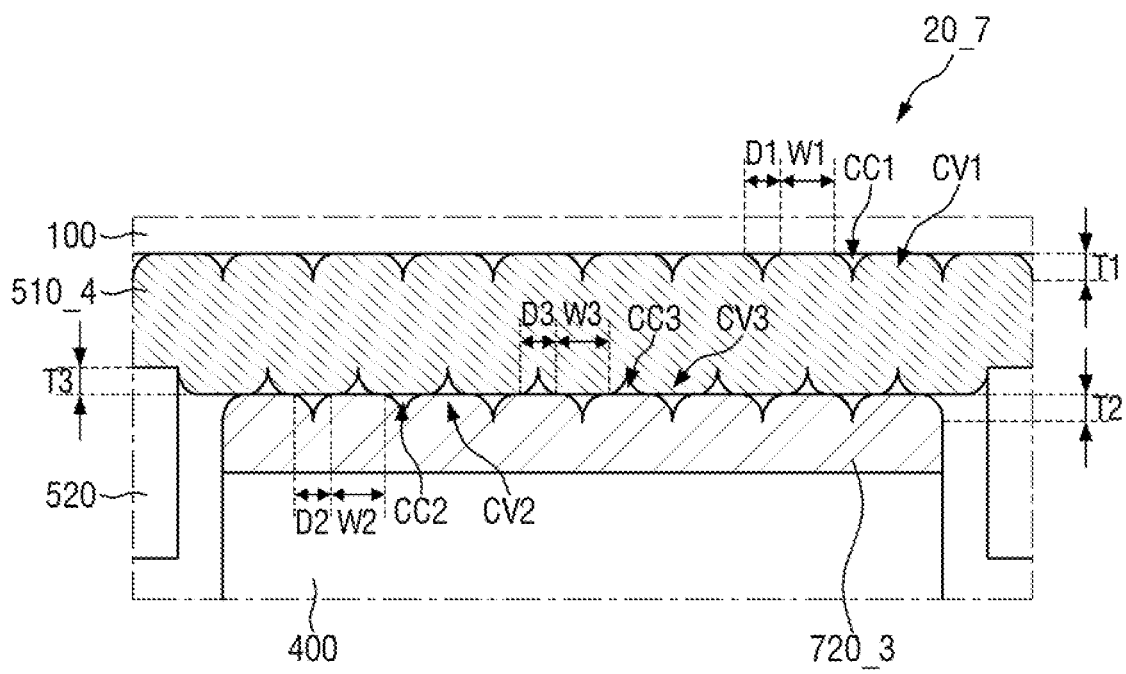

FIGS. 14 and 15 are cross-sectional views of exemplary panel bottom members.

Referring first to FIGS. 13 and 14, a panel bottom member 20_6 of FIG. 14 differs from the panel bottom member 20_5 of FIG. 13 in that the panel bottom member 20_6 of FIG. 14 includes a light-blocking member 510_3.

The light-blocking member 510_3 may include a substrate 511, a first light-absorbing layer 512, an upper bonding layer 513, a second light-absorbing layer 514, and a lower bonding layer 515. The light-blocking member 510_3 differs from the light-blocking member 510_1 of FIG. 9 in that the light blocking member 510_3 further includes the lower bonding layer 515.

The lower bonding layer 515 may be disposed on the bottom surface of the second light-absorbing layer 514 (or on the bottom surface of the substrate 511). The lower bonding layer 515 may couple the light-blocking member 510_3 and a vibration acoustic device 400 together and may couple the light-blocking member 510_3 and a buffer member 520 together. The lower bonding layer 515 may include an adhesive layer or a resin layer and may comprise the same material as the upper bonding layer 513.

Third concave patterns CC3 may be formed on the bottom surface of the lower bonding layer 515. The third concave patterns CC3, like first concave patterns CC1, may be formed by coating an adhesive (or an adhesive layer for forming the lower bonding layer 515) on a release film having convex patterns corresponding to the third concave patterns CC3 and laminating and drying the substrate 511 of the light-blocking member 510_3 (or the substrate 511 with the second light-absorbing layer 514 coupled thereto).

As illustrated in FIG. 14, the third concave patterns CC3 may be formed only on a part of the bottom surface of the lower bonding layer 515 overlapping with the vibration acoustic device 400. For example, the third concave patterns CC3 might not be formed on a part of the lower bonding layer 515 overlapping with the buffer member 520, but the present disclosure is not limited thereto.

Referring to FIGS. 13 and 15, a panel bottom member 20_7 differs from the panel bottom member 20_5 of FIG. 13 in that the panel bottom member 20_7 of FIG. 15 includes a light-blocking member 510_4 and a bonding member 720_3.

The light-blocking member 510_4 differs from the light-blocking member 510_2 of FIG. 13 in that the light-blocking member 510_4 of FIG. 15 includes a bottom surface with third concave patterns CC3 formed thereon.

The third concave patterns CC3 may be substantially the same as the third concave patterns CC3 of FIG. 10. For example, a third width D3 of the third concave patterns CC3, which are formed on the bottom surface of the light-blocking member 510_4, the distance between the third concave patterns CC3 (or a width W3 of third convex patterns CV3), and a third depth 13 of the third concave patterns CC3 may be the same as a first width D1 of first concave patterns CC1, which are formed on the top surface of the light-blocking member 510_4, the distance between the first concave patterns CC1 (or a width W1 of first convex patterns CV1), and a first depth T1 of the first concave patterns CC1, respectively.

The third concave patterns CC3 may be formed on only a part of the bottom surface of the light-blocking member 510_4 that overlaps with a vibration acoustic device 400. For example, the third concave patterns CC3 might not be formed on a part of the light-blocking member 510_4 overlapping with a buffer member 520, but the present disclosure is not limited thereto.

The bonding member 720_3 may be substantially the same as the first bonding member 720_3 of FIG. 10. For example, a second width D2 of second concave patterns CC2, which are formed on the top surface of the bonding member 720_3, the distance between the second concave patterns CC2 (or a width W2 of second convex patterns CV2), and a second depth T2 of the second concave patterns CC2 may be the same as the first width D1 of the first concave patterns CC1, which are formed on the top surface of the light-blocking member 510_4, the distance between the first concave patterns CC1 (or the width W1 of the first convex patterns CV1), and the first depth T1 of the first concave patterns CC1, respectively.

Thus, even if the light-blocking member 510_4 and the bonding member 720_3 have relatively small concave patterns (or embossed patterns), the generation of bubbles in the process of coupling the light-blocking member 510_4 and the vibration acoustic device 400 or defects that may be caused by the bubbles can be prevented by allowing the third concave patterns CC3 of the light-blocking member 510_4 and the second concave patterns CC2 of the bonding member 720_3 to overlap each other or to be in direct contact with each other.

Figure 16:
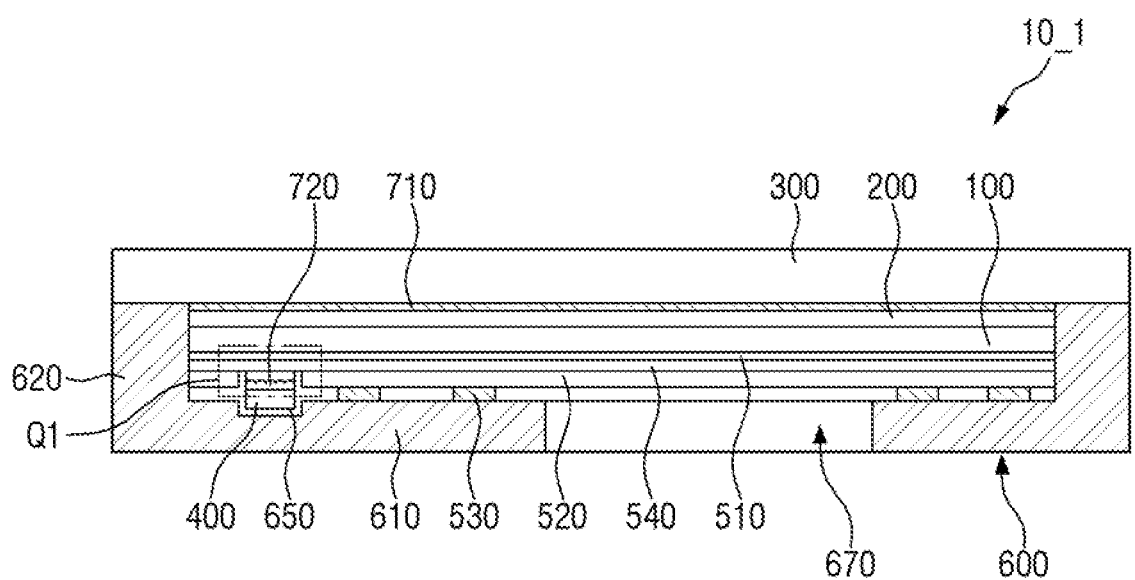
FIG. 16 is a cross-sectional view of a display device according to an exemplary embodiment of the present disclosure.
Figure 17:
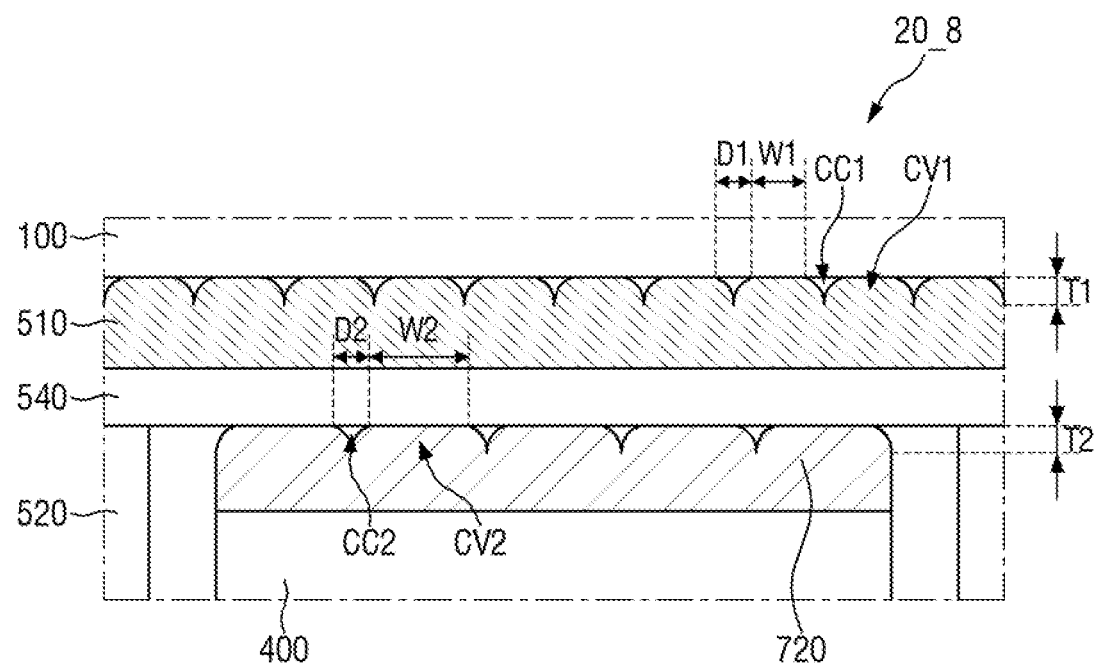
FIG. 17 is an enlarged cross-sectional view illustrating a part Q1 of FIG. 16.

FIG. 16 is a cross-sectional view, taken along line A-A' of FIG. 1, of a display device according to an exemplary embodiment of the present disclosure. FIG. 17 is an enlarged cross-sectional view illustrating a part Q1 of FIG. 16.

Referring to FIGS. 1, 3, 16, and 17, a display device 10_1 of FIG. 16 differs from the display device 10 of FIG. 3 in that the display device 10_1 of FIG. 16 includes a panel bottom member 20_8. The panel bottom member 20_8 differs from the panel bottom member 20 of FIG. 5 in that the panel bottom member 20_8 further includes a function layer 540.

The panel bottom member 20_8 may perform a heat dissipation function, an electromagnetic shielding function, a pattern visibility prevention function, a grounding function, a reinforcing function, and/or a digitizing function. In this case, the function layer 540 may be a supporting substrate, a heat dissipation layer, an electromagnetic shielding layer, an impact absorbing layer, a bonding layer, a pressure sensor, and/or a digitizer.

The function layer 540 may be disposed between a light-blocking member 510 and a vibration acoustic device 400 (or a bonding member 720) and between the light-blocking member 510 and a buffer member 520.

The function layer 540 may have substantially the same size and shape as the light-blocking member 510, may be disposed below the light-blocking member 510, and may be coupled to the bottom surface of the light-blocking member 510 through an additional adhesive film.

The function layer 540 may be a sheet layer, a film layer, a thin film layer, a coating layer, a panel, and/or a plate. The function layer 540 may consist of a single layer or may include a stack of multiple films or coating layers.

According to an exemplary embodiment of the present disclosure, the function layer 540 may be a black tape. Here, the black tape can prevent elements disposed therebelow (e.g., the vibration acoustic device 400, the buffer member 520, and the like) from being visible from above.

According to an exemplary embodiment of the present disclosure, the function layer 540 may be a digitizer. The digitizer may be coupled to the bottom surface of the light-blocking member 510 through an adhesive film.

The digitizer receives information regarding a position on a screen designated by a user. The digitizer recognizes the movement of, for example, a stylus pen or finger, and converts the recognized movement into a digital signal. The digitizer may be provided in the form of a film or a panel.

FIG. 16 illustrates only one function layer, but the present disclosure is not limited thereto. For example, the function layer 540 may consist of a stack of at least two of a supporting substrate, a heat dissipation layer, an electromagnetic shielding layer, a pressure sensor, and a digitizer.

Figure 18:
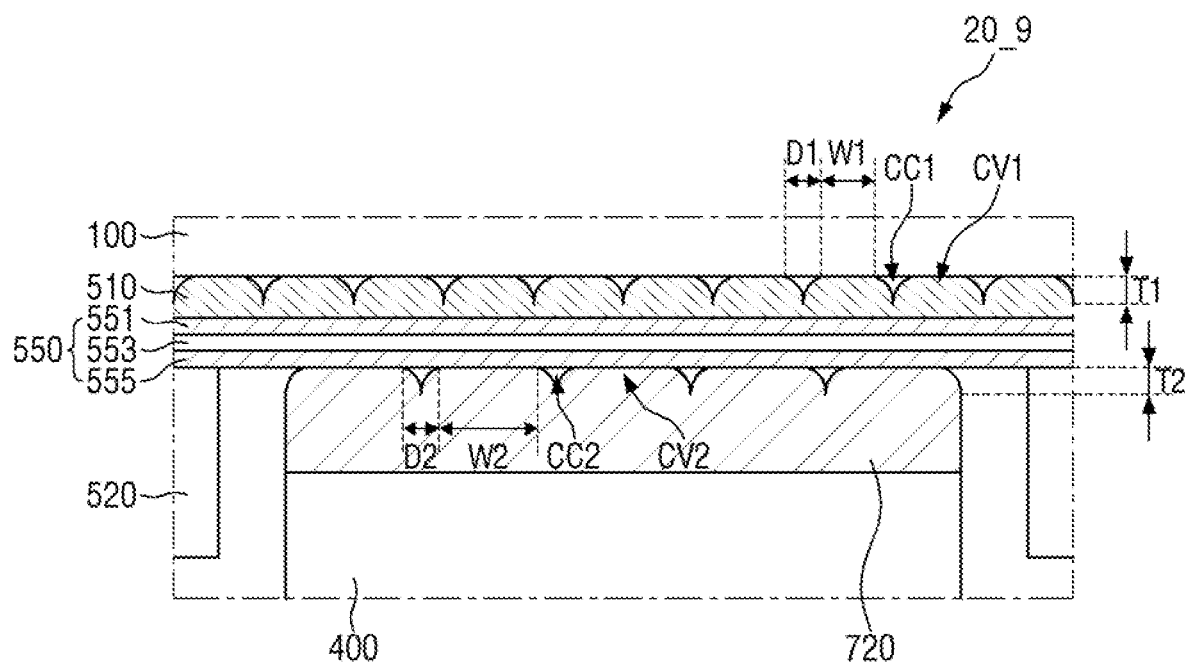
FIG. 18 is a cross-sectional view illustrating an exemplary panel bottom member.

FIG. 18 is a cross-sectional view of an exemplary panel bottom member.

Referring to FIG. 18, a panel bottom member 20_9 differs from the panel bottom member 20_8 of FIG. 17 in that the panel bottom member 20_9 of FIG. 18 includes a heat dissipation member 550.

Similarly to the function layer 540 of FIG. 17, the beat dissipation member 550 may be disposed between a light-blocking member 510 and a vibration acoustic device 400 (or a bonding member 620) and between the light-blocking member 510 and a buffer member 520.

The heat dissipation member 550 may include at least one heat dissipation layer. The beat dissipation member 550 may include two heat dissipation layers, e.g., first and second heat dissipation layers 551 and 555, and a bonding layer 553.

The first and second heat dissipation layers 551 and 555 may be formed of the same material or may be formed of different materials having different heat dissipation characteristics. For example, the first heat dissipation layer 551 may comprise graphite or CNTs. The second heat dissipation layer 555 may block electromagnetic waves and may comprise various materials with excellent thermal conductivity. For example, the second heat dissipation layer 555 may include a thin film formed of a metal such as copper, nickel, ferrite, or silver.

The second heat dissipation layer 555 may be disposed below the first heat dissipation layer 551. The first and second heat dissipation layers 551 and 555 may be disposed to overlap each other. The first heat dissipation layer 551 may be smaller in size than the second heat dissipation layer 555, and the sides of the first heat dissipation layer 551 may be disposed inside the sides of the second heat dissipation layer 555.

The bonding layer 553 may be disposed between the first and second bonding layers 551 and 555. The bonding layer 553 may couple the first and second bonding layers 551 and 555 together and may completely cover the first heat dissipation layer 551. The bonding layer 553 may be formed of one of the above-described examples of the material of the bottom bonding, layer 530.

According to an exemplary embodiment of the present disclosure, the heat dissipation member 550, like the buffer member 520, might not overlap the vibration acoustic device 400. Here, a sufficient space can be secured for the vibration of the vibration acoustic, device 400.

FIGS. 17 and 18 illustrate the panel bottom members 20_8 and 20_9, respectively, as including only one function layer 540 or only one heat dissipation member 550, but the present disclosure is not limited thereto. For example, alternatively, each of the three layers (e.g., the first heat dissipation layer 551, the bonding layer 553, and the second heat dissipation layer 555) included in the panel bottom member 20_9 may be one of a supporting substrate, a heat dissipation layer, an electromagnetic shielding layer, an impact absorbing layer, a bonding layer, a pressure sensor, and a digitizer.

Although exemplary embodiments of the present invention have been disclosed for illustrative purposes, those skilled in the art will appreciate that various modifications, additions and substitutions are possible, without departing from the scope and spirit of the present invention.

What is claimed is:
1. A panel assembly, comprising:
   a display panel;
   light-blocker, coupled directly to the display panel, with first concave patterns formed on a top surface thereof;
   a vibration acoustic device disposed below the light-blocker, and coupled to the light-blocker, the vibration acoustic device being coupled to the display panel via the light-blocker, the vibration acoustic device being overlapped by the display panel;
a buffer disposed below the light-blocker; and
a bonding disposed between the light-blocker and the vibration acoustic device, the bonding having second concave patterns formed on a top surface thereof,
wherein the second concave patterns are different from the first concave patterns.

2. The panel assembly of claim 1, wherein a second depth of the second concave patterns in a thickness direction of the bonding is greater than a first depth of the first concave patterns of the light-blocker.

3. The panel assembly of claim 1, wherein the bonding is a double-sided adhesive tape.

4. The panel assembly of claim 1, wherein the vibration acoustic device includes a first electrode, a second electrode, and a vibration material layer disposed between the first and second electrodes, and wherein the vibration material layer includes a piezoelectric body, a piezoelectric film, and/or an electro active polymer.

5. The panel assembly of claim 1, farther comprising:
an interlayer bonding disposed between the light-blocker and the buffer and spaced apart from the bonding,
wherein the interlayer bonding does not overlap the vibration acoustic device.

6. The panel assembly of claim 1, further comprising: a digitizer disposed between the light-blocker and the buffer, wherein the digitizer at least partially overlaps the vibration acoustic device.

7. The panel assembly of claim 1, wherein the bonding is disposed between the light-blocker and the buffer, and wherein the second concave patterns do not overlap the buffer.

8. The panel assembly of claim 1, wherein a second volume per unit area of a second air passage formed by the second concave patterns between the top surface and a bottom surface of the bonding is greater than a first volume per unit area of a first air passage formed by the first concave patterns between the top surface and a bottom surface of the light-blocker.

9. The panel assembly of claim 8, wherein a surface area of an upper part of the second an passage that is in contact with the light-blocker is within a range of 10% to 30%, inclusive, of a top surface of the bonding.

10. The panel assembly of claim 1, wherein a second width of the second concave patterns in a direction parallel to one surface of the bonding is greater than a first width of the first concave patterns.

11. The panel, assembly of claim 10, wherein the second width of the second concave patterns is within a range of 5% to 15% of a width of convex patterns defined by the second concave patterns.

12. The panel assembly of claim 1, further comprising: a heat dissipator disposed between the light-blocker and the buffer.

13. The panel assembly of claim 12, wherein the heat dissipator at least partially overlaps the vibration acoustic device.

14. The panel assembly of claim 1, wherein the light-blocker includes:
a substrate,
a first light-blocking layer disposed on a top surface of the substrate and at least partially overlapping the vibration acoustic device, and
a top bonding layer disposed on a top surface of the first light-blocking layer.

15. The panel assembly of claim 14, wherein the first light-blocking layer includes a light-absorbing material.

16. The panel assembly of claim 14, wherein the light-blocker further includes a second light-blocking layer at least partially overlapping the vibration acoustic device,
wherein the second light-blocking layer is disposed on a bottom surface of the substrate, and
wherein the bonding and the vibration acoustic device are each disposed below the second light-blocking layer.

17. The panel assembly of claim 1, wherein the bonding includes:
a substrate having third concave patterns substantially aligned with the second concave patterns,
a first adhesive layer disposed on a top surface of the substrate, and
a second adhesive layer disposed on a bottom surface of the substrate.

18. The panel assembly of claim 17, wherein the third concave patterns are arranged repeatedly in the form of isolated islands.

19. The panel assembly of claim 17, wherein the third concave patterns extend in a first direction and are arranged repeatedly in a second direction, which intersects the first direction.

20. The panel assembly of claim 17, wherein the substrate has a mesh structure.

21. The panel assembly of claim 17, wherein the substrate has a fabric structure, and wherein the substrate includes:
first lines extending in a first direction and arranged in a second direction, which intersects the first direction, and
second lines extending in the second direction and arranged in the first direction crossing the first lines.

22. A panel assembly, comprising:
a display panel;
a light-blocker, coupled directly to the display panel, having a top surface with first concave patterns formed thereon and a bottom surface with second concave patterns formed thereon;
a vibration acoustic device disposed below the light-blocker, and coupled to, the light-blocker, the vibration acoustic device being coupled to the display panel via the light-blocker, the vibration acoustic device being overlapped by the display panel; and
a buffer disposed below the light-blocker,
wherein a second air passage formed by the second concave patterns between the light-blocker and the vibration acoustic device is different from a first air passage formed by the first concave patterns.

23. The panel assembly of claim 22, wherein concave patterns are formed on the entire top surface of the light-blocker,
wherein the second concave patterns are formed in a first area on the bottom surface of the light-blocker, and
wherein the first area at least partially overlaps with the vibration acoustic device.

24. The panel assembly of claim 22, wherein a second depth of the second concave patterns is greater than a first depth of the first concave patterns.

25. The panel assembly of claim 22, wherein a second width of the second concave patterns in a direction parallel to a surface of the bonding is greater than a first width of the first concave patterns.

26. The panel assembly of claim 22, wherein a second volume per unit area of the second air passage is greater that a first volume per unit area of the first air passage.

27. The panel assembly of claim 26, wherein a surface area of a lower part of the second air passage that is in contact with the vibration acoustic device is within a range of 10% to 30% of a top surface of the bonding.

28. The panel assembly of claim 22, further comprising:
a bonding disposed between the light-blocker and the vibration acoustic device and having a top surface with third concave patterns formed thereon,
wherein the vibration acoustic device is coupled to the light-blocker through the bonding, and
wherein the second air passage is formed by the second concave patterns and the third concave patterns.

29. The panel assembly of claim 28, wherein the first concave patterns, the second concave patterns, and the third concave patterns all have the same width and the same depth.

30. The panel assembly of claim 28, wherein the second concave patterns extend in a first direction over the bottom surface of the light-blocker and are arranged in a second direction which intersects the first direction, and wherein the third concave patterns extend in the second direction over the top surface of the bonding and are arranged in the first direction.

31. A display device, comprising:
a display panel; and
a panel bottom assembly disposed below the display panel,
wherein the panel bottom assembly includes:
    a light-blocker, coupled directly to the display panel, having a top surface with first concave patterns formed thereon,
    a vibration acoustic device disposed below the light-blocker, and coupled to, the light-blocker, the vibration acoustic device being coupled to the display panel via the light-blocker, the vibration acoustic device being overlapped by the display panel,
    a buffer disposed below the light-blocker, and
    a bonding disposed between the light-blocker and the vibration acoustic device and having a top surface with second concave patterns formed thereon, and
wherein the second concave patterns differ from the first concave patterns.

* * * * *